(12) United States Patent
Nakamura

(10) Patent No.: US 7,930,634 B2
(45) Date of Patent: Apr. 19, 2011

(54) DOCUMENT DISPLAY APPARATUS AND DOCUMENT DISPLAY PROGRAM

(75) Inventor: Satoshi Nakamura, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 876 days.

(21) Appl. No.: 11/854,962

(22) Filed: Sep. 13, 2007

(65) Prior Publication Data

US 2008/0092040 A1 Apr. 17, 2008

(30) Foreign Application Priority Data

Sep. 15, 2006 (JP) ................................. 2006-251887

(51) Int. Cl.
*G06F 17/00* (2006.01)
(52) U.S. Cl. ........................................ 715/273; 715/252
(58) Field of Classification Search .................. 715/243, 715/244, 246, 249, 252, 253, 273; 345/619, 345/660
See application file for complete search history.

(56) References Cited

U.S. PATENT DOCUMENTS

| | | | | |
|---|---|---|---|---|
| 5,524,198 A * | 6/1996 | Matsumoto et al. | ........... | 715/781 |
| 6,230,169 B1 * | 5/2001 | Nagae | ............... | 715/203 |
| 6,567,980 B1 * | 5/2003 | Jain et al. | .......... | 725/61 |
| 6,920,617 B2 * | 7/2005 | Nitta | ............... | 715/745 |
| 6,968,502 B1 * | 11/2005 | Kubomura et al. | ........... | 715/202 |
| 7,512,879 B2 * | 3/2009 | Weil et al. | ........... | 715/251 |
| 2002/0025084 A1 * | 2/2002 | Yang et al. | ........... | 382/299 |
| 2002/0077832 A1 * | 6/2002 | Leonid et al. | ........... | 704/276 |
| 2003/0028560 A1 * | 2/2003 | Kudrolli et al. | ........... | 707/509 |
| 2003/0030678 A1 * | 2/2003 | Rosenholtz et al. | ........... | 345/838 |
| 2003/0179234 A1 * | 9/2003 | Nelson et al. | ........... | 345/764 |
| 2003/0210281 A1 * | 11/2003 | Ellis et al. | ........... | 345/838 |
| 2004/0046768 A1 * | 3/2004 | Nakajima | ........... | 345/619 |
| 2005/0091254 A1 * | 4/2005 | Stabb et al. | ........... | 707/102 |
| 2006/0112333 A1 * | 5/2006 | Iwanaga | ........... | 715/531 |
| 2006/0156254 A1 * | 7/2006 | Satake | ........... | 715/838 |
| 2006/0236238 A1 * | 10/2006 | Yoshikawa | ........... | 715/530 |

FOREIGN PATENT DOCUMENTS

| | | |
|---|---|---|
| JP | A 08-153100 | 6/1996 |
| JP | A 2001-297303 | 10/2001 |
| JP | A 2007-011513 | 1/2007 |

\* cited by examiner

*Primary Examiner* — Laurie Ries
(74) *Attorney, Agent, or Firm* — Blakely, Sokoloff, Taylor & Zafman LLP

(57) ABSTRACT

A document display apparatus extracts a document element constituting a document and enlarges and displays the extracted document element. The document display apparatus includes: a document display unit that displays the document element in a first display area; a document element selection detection unit that detects selection of the document element displayed by the document display unit; and a selected document display unit to display the document element detected by the document element selection detection unit in a second display area different from the first display area.

8 Claims, 34 Drawing Sheets

FIG.18
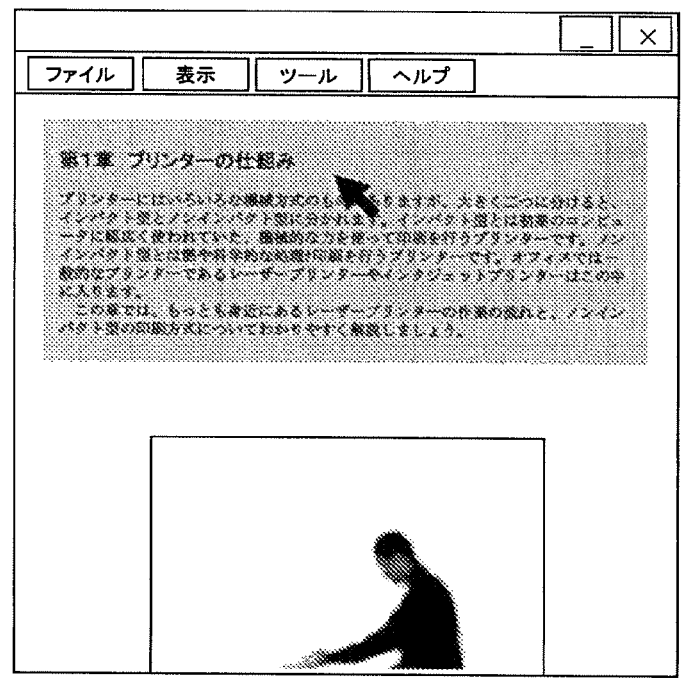
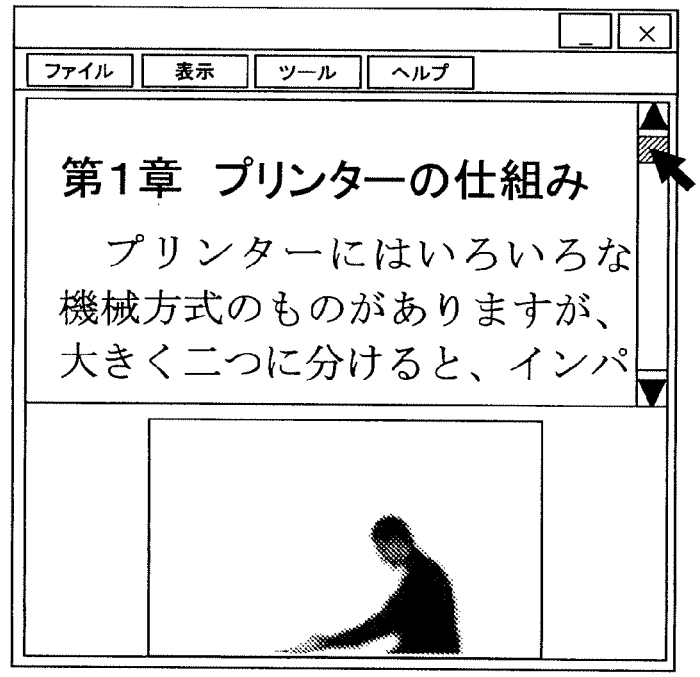

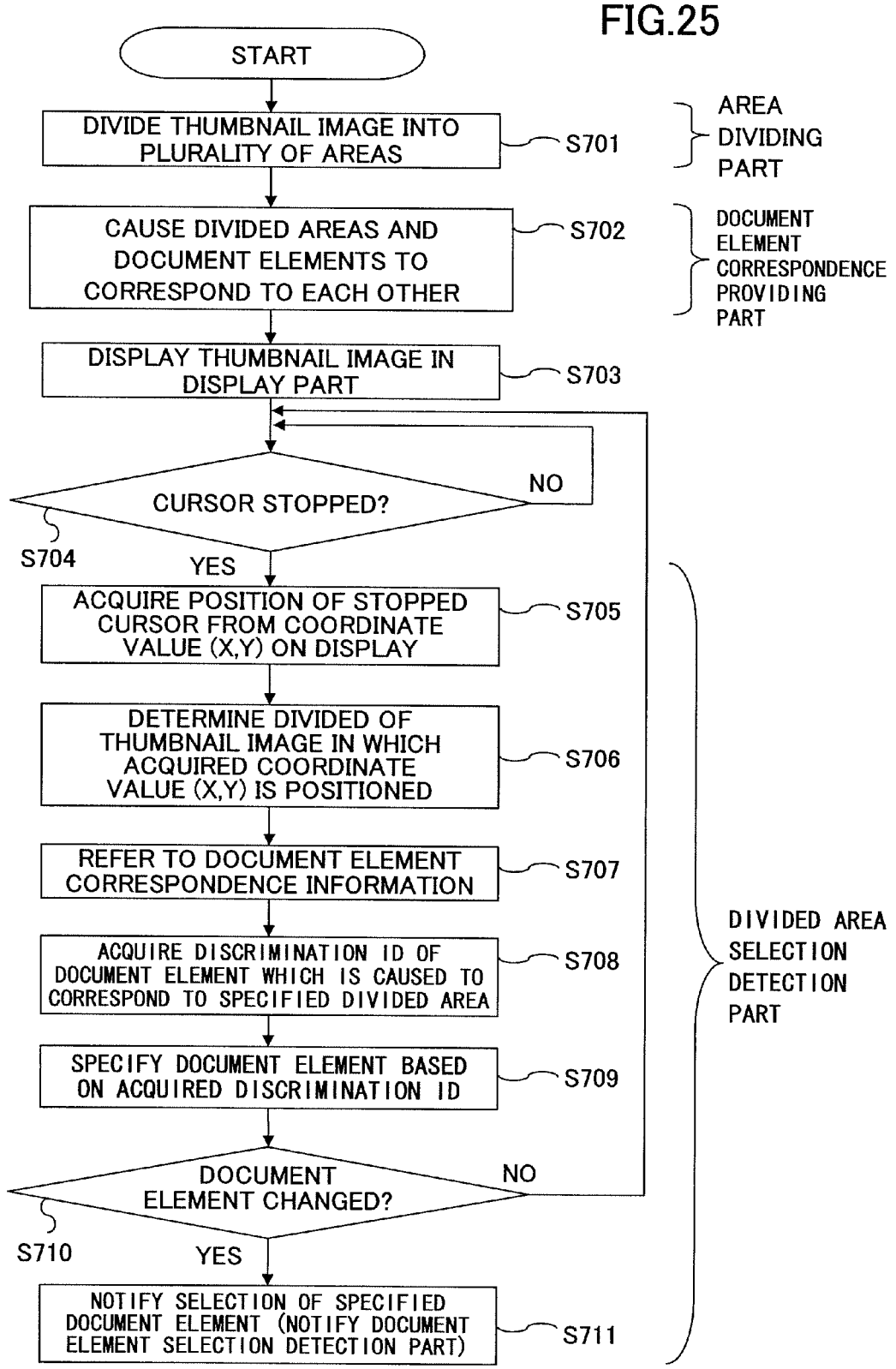

DOCUMENT DISPLAY APPARATUS AND DOCUMENT DISPLAY PROGRAM

PRIORITY

The present application claims priority to and incorporates by reference the entire contents of Japanese patent application, No. 2006-251887, filed in Japan on Sep. 15, 2006.

BACKGROUND OF THE INVENTION

1. Field of the Invention

The present invention relates to document display apparatuses and document display programs and, more particularly, to a document display apparatus and a document display program that facilitate a user viewing contents of documents.

2. Description of the Related Art

In the present office environment, with a background of reducing papers, saving spaces and sharing information, paper documents have been managed by making electronic document data via reading documents using a reading device such as a scanner or the like. In order to review this—created document data, software for reviewing document data (referred to as a document data viewer) is installed in a personal computer (PC) serving as a user terminal.

A description will be given below of how software for viewing document data (the document data viewer) provides a document data reviewing function to a user. First, as a process prior to viewing, document elements constituting a document, such as "character elements", "drawing elements", "table elements", "image elements", "ruled line elements", etc., are extracted by using an area discrimination technique in a case of image type document data or by directly discriminating data codes in a case of individual application data type document data, and the extracted document elements are displayed on a display screen.

In such software for viewing document data (document data viewer), functions which users ask for are operationality to enable a user to easily view the document data which the user wants to view and with respect to the contents of document data being easily read visually. However, there are various environments in which users view document data. There are considered mobile terminals such as a cellular phone or a personal digital assistant (PDA) other than personal computers (PCs). Accordingly, an optimum environment for viewing document data is not always put in place.

Thus, a problem arises in document data viewing software (document data viewer) is how to acquire operationality or visibility corresponding to a display environment of a user. For example, there is suggested a technique to acquire visibility by controlling an amount of information to be displayed in accordance with a size or a resolution, which are the display environment of a user (see Japanese Laid-Open Patent Application No. 8-153100). Additionally, there is suggested a technique to acquire operationality and visibility by displaying an index of a tree structure having a development/folding function based on a hierarchical structure of a document and selecting an item to be viewed from the index. See also Japanese Laid-Open Patent Application No. 2001-297303

Moreover, generally, the document data viewing software (document viewer) has a function to allow a user to arbitrarily select a display method to meet for the purpose of viewing. For example, there is a function to reduce a size of an entire document image in response to a page size in consideration of a case where a user wants to grasp the entire document. There also is a function to enlarge a document image in response to a page width in consideration of a case where a user wants to view the contents of the document in detail. Further, there is a function to enlarge a part of a document image at an arbitrary magnification, like a magnifying glass, by pointing a pointer of a pointing device to a part which the user wants to view.

As mentioned above, the document data viewing software (document data viewer) provides operationality and visibility when a user views document data.

However, when a user attempts to display contents, which the user wants to view, by using an enlarging function provided to the conventional document data viewing software, only a part of the contents may be displayed due to a magnification to the size of the display screen. In order to display the rest of the contents, the user must move a scroll bar provided in the display window upward and downward and leftward and rightward to move the part of the contents into a display range of the display window. Such an operation is inconvenient for the user, and it cannot be the that operationality and visibility are provided.

SUMMARY OF THE INVENTION

A document display apparatus and document display program are described. In one embodiment, a document display apparatus extracts a document element constituting a document and enlarges and displays the extracted document element, the document display apparatus comprising: a document display unit to display the document element in a first display area; a document element selection detection unit to detect selection of the document element displayed by the document display unit; and a selected document display unit to display the document element detected by the document element selection detection unit in a second display area different from the first display area.

BRIEF DESCRIPTION OF DRAWINGS

FIG. 18 is an illustration showing a display screen displaying the document elements in a small display area according to the first embodiment of the present invention;

FIG. 25 is a flowchart of a process to notify a user of selection of a document element upon detection of the selection of the document data by a cursor movement according to the second embodiment of the present invention.

DETAILED DESCRIPTION OF THE PREFERRED EMBODIMENTS

Figure 1:
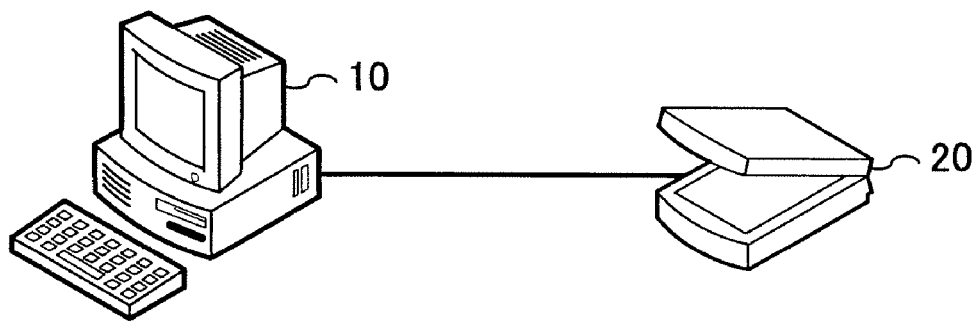
FIG. 1 is an illustration showing a use environment of a document display apparatus according to first and second embodiments of the present invention.

It is a general embodiment of the present invention to provide an improved and useful document display apparatus and a document display program in which the above mentioned problems are eliminated.

A more specific embodiment of the present invention includes a document display apparatus and a document display program which facilitate a user to view contents of document data.

In order to achieve the above-mentioned embodiments, there is provided, according to one embodiment of the present invention, a document display apparatus that extracts a document element constituting a document and enlarges and displays the extracted document element, the document display apparatus comprising: a document display unit that displays the document element in a first display area; a document element selection detection unit that detects selection of the document element displayed by the document display unit; and a selected document display unit which displays the document element detected by the document element selection detection unit in a second display area different from the first display area.

The document display apparatus according to one embodiment of the present invention may further comprises a character element determination unit that determines whether the document element detected by the document element selection detection unit is a character element; a character image determination unit that determines whether the document element determined to be a character element by the document element selection detection unit is a character image; and a character number determination unit that determines whether a number of characters per one line in the second display area before enlarge display is greater than a number of characters per one line in the second display area after the enlarge display with respect to the character image determined to be a character image by the character image determination unit, wherein the selected document element display unit may display the character image in the second display area by folding the character image when enlarging and displaying the character image if the character number determination unit determines that the umber of characters per one line in the second display area before enlarging the display is greater than the number of characters per one line in the second display area after enlarging the display.

The document display apparatus according to one embodiment of the present invention may further comprise: a character element determination unit that determines whether the document element detected by the document element selection detection unit is a character element; a character image determination unit that determines whether the document element determined to be the character element is a character image; and a transparent text generation unit that generates transparent text with respect to the character image based on a result of character recognition, wherein the selected document element display unit may display the character image and the transparent text by superposing one onto the other using the transparent text generation unit when the character image determination unit determines that the character element is a character image.

The document display apparatus according to one embodiment of the present invention may further comprise: a character element determination unit that determines whether the document element detected by the document element selection detection unit is a character element, wherein the selected document element determination unit may compress the document element other than the character element in order to fit in the display area when the document element determined to be an element other than a character element by the character element determination unit does not fit in a width and/or a height of the second display area.

In the document display apparatus according to one embodiment of the present invention, when displaying the document element detected by the document element selection detection unit, the selected document element display unit may display document information positioned in a periphery of the document element in the first display area at a corresponding position in the second display area together with the document element.

In the document display apparatus according to one embodiment of the present invention, the document display unit may display a thumbnail image of an entire document in the first display area.

The document display apparatus according to one embodiment of the present invention may further comprises a thumbnail image area dividing unit that divides the thumbnail image into a plurality of divided areas; a document element correspondence providing unit that causes the document elements that correspond to the divided areas acquired by the thumbnail image area dividing unit; and a divided area selection detection unit that detects the selection of the divided areas acquired by the thumbnail image area dividing unit, where the divided area selection detection unit notifies the document element selection detection unit of the fact that a document element caused to correspond by the document element correspondence providing unit is selected.

In the above-mentioned document display apparatus, when the divided area selection detection unit detects that one of the divided areas is selected, the document display unit may display one of the divided areas corresponding to the document element that is the same as the detected divided, in a form different than that of a divided area that corresponded to a document element different from the document element of the detected divided area.

There is provided according to another embodiment of the present invention a computer readable document display program for a document display apparatus that extracts a document element constituting a document and enlarges and displays the extracted document element, the computer readable document display program causing a computer to function as: a document display unit that displays the document element in a first display area; a document element selection detection unit that detects selection of the document element displayed by the document display unit; and a selected document display unit which displays the document element detected by the document element selection detection unit in a second display area different from the first display area.

Other embodiments, features and advantages of the present invention will become more apparent from the following detailed description when read in conjunction with the accompanying drawings.

A description will now be given, with reference to the drawings, of document display apparatuses according to embodiments of the present invention. It should be noted that the document display apparatus according to one embodiment of the present invention may be an electronic apparatus that can display document data such as, for example, a multifunctional peripheral, a personal computer, a cellular phone, a car navigation system, a refrigerator, etc.

First Embodiment

FIG. 1 is an illustration showing a use environment of a document display apparatus according to a first embodiment of the present invention.

The use environment shown in FIG. 1 includes a document display apparatus 10 and an image reading apparatus 20 such as a scanner. The document display apparatus 10 is connected to the image reading apparatus 20 bay a connection cable which can transmit data signals. Thereby, through the connection cable, the document display apparatus 10 can acquire document image data, which the image reading apparatus 20 read, and display the document image data on a display screen by document displaying software (hereinafter, referred to as "document displaying application") installed therein. In addition to the display of the document image data acquired from the image reading apparatus 20, the document display apparatus 10 can display document data created by various applications installed in the document display apparatus 10 on the display screen by using the document display application.

Figure 2:
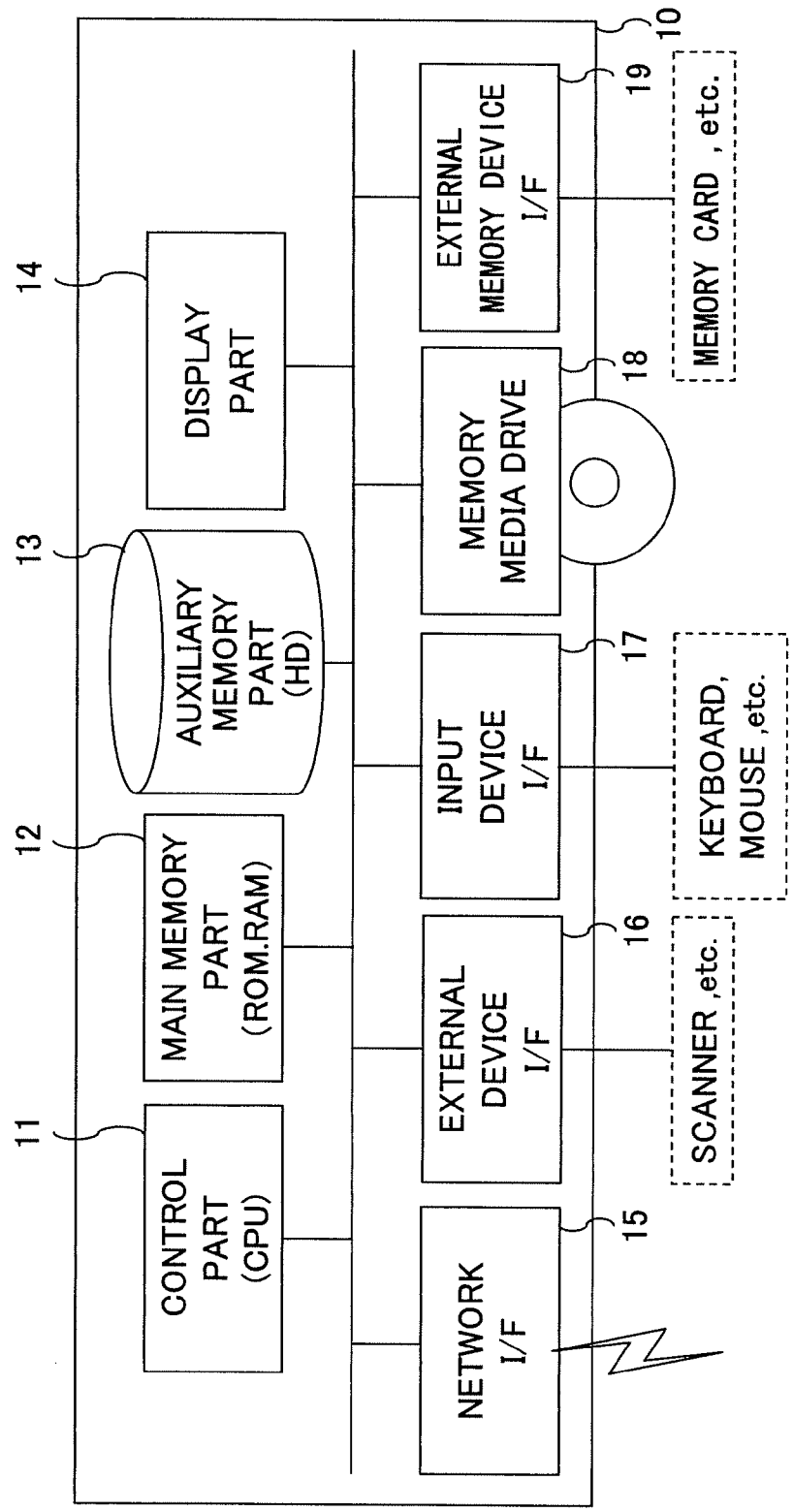
FIG. 2 is a block diagram of the document display apparatus according to the first and second embodiments of the present invention.

A description will be given below, with reference to FIG. 2, of a hardware structure of the document display apparatus 10 shown in FIG. 1. FIG. 2 is a block diagram showing a hardware structure of the document display apparatus according to the first embodiment of the present invention.

The document display apparatus 10 comprises a control unit 11, a main memory unit 12, an auxiliary memory unit 13, a display unit 14, a network interface (I/F) 15, an external device I/F 16, an input device I/F 17, a memory media drive 18, and an external storage device I/F 19.

The control unit 11 is a control circuit including a CPU (Central Processing Unit), which controls the document display apparatus 10. Therefore, in the control unit 11, an operating system (OS), which is basic software for controlling the document display apparatus 10, operates in the control unit 11. Moreover, the control unit 11 executes on the OS a document display program, which is the document display application installed in the document display apparatus 10. Therefore, the control unit 11 performs command execution and operation process of the document display program.

The main memory unit 12 is provided with a ROM (Read Only Memory) and a RAM (Random Access Memory). The ROM is a memory circuit for storing the OS operating in the control unit 11, the document display program installed in installed in the document display apparatus 10 and data used by the program. The RAM is a memory circuit for temporarily storing therein the developed document display program and data, which are stored in the ROM and developed (loaded).

The auxiliary memory unit 13 is a storage device such as a hard disk drive (HD) or the like which stores data used by the document display program. The display unit 14 is a display device which displays document information, which a user wants to view, by executing the document display program by the control unit 11.

The network I/F 15 is a hardware interface for carrying out bidirectional data communications between communication equipments on a network such as a local area network (LAN), a public network or a radio frequency network. The external device I/F 16 is a hardware interface for carrying out data communications between the image reading apparatus 20 such as a scanner and the document display apparatus 10. The input device I/F 17 is a hardware interface for carrying out data communications between the input device such as a mouse and the document display apparatus 10.

The memory media drive 18 is a reading and writing device for reading data stored in storage media such as a flexible disk (FD), a magneto-optical disk (MO), a compact disc (CD), a digital versatile disk (DVD), etc., and writing data to store the data in the recording media.

The external storage device I/F 19 is a hardware interface for carrying out data communications between external storage devices such as a memory card and the document display apparatus 10.

Each piece of hardware discussed above is connected to a bus, which is a signal transmission path, so that control command signals from the control unit 11 are transmitted to the main memory unit 12, the auxiliary memory unit 13, the display unit 14, the network I/F 15, the external equipment I/F 16, input device I/F 17, the memory media drive 18, and external storage device I/F 19. Moreover, data signals are transmitted to the control unit 11 in accordance with the control command from the main memory unit 12, the auxiliary memory unit 13, the external device I/F 16, the input equipment I/F 17, the memory media drive 18, and the external storage device I/F 19.

Thus, the control unit 11 of the document display apparatus 10 controls operation of the entire document display apparatus 10 including the main memory unit 12, the auxiliary memory unit 13, the display unit 14, the network I/F 15, the external equipment I/F 16, the input device I/F 17, the memory media drive 18, and external storage device I/F 19 through the bus by developing the document display program and the data stored in the ROM of the main memory unit 12 on the RAM of the main memory unit 12. Therefore, the document display apparatus 10 achieves the document display function of its own by extracting document elements from document data and sending a signal (RGB signal) for instructing the display screen 14 to display the extracted document elements.

Figure 3:
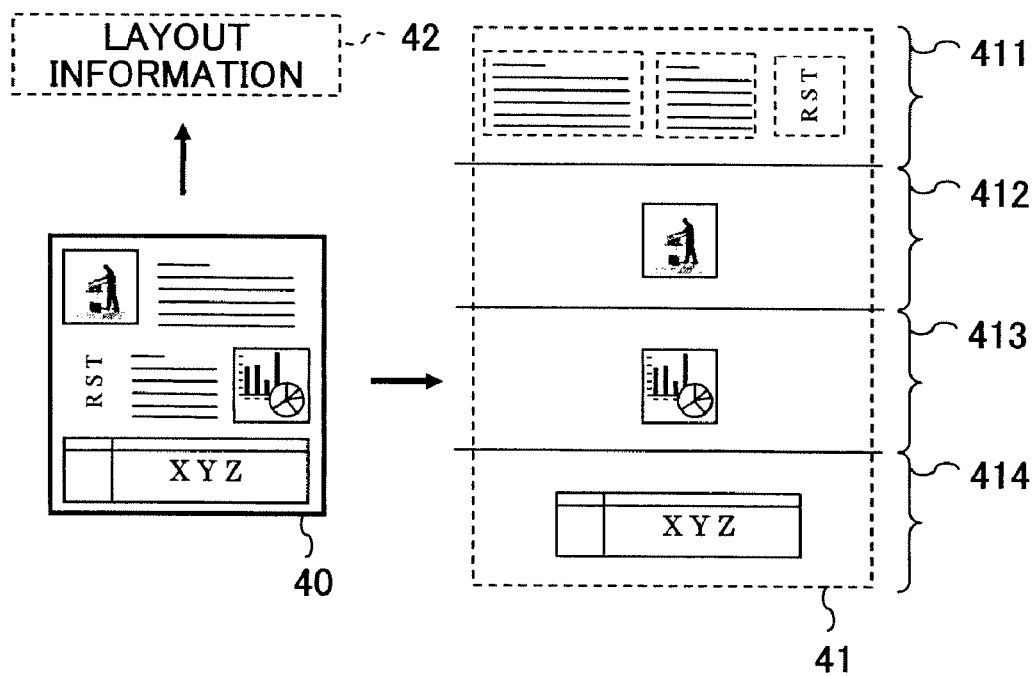
FIG. 3 is an illustration showing an example of document elements according to the first and second embodiments of the present invention.

A description will be now given, with reference to FIG. 3, of an extracting method of document elements consisting document data. FIG. 3 is an illustration showing a structure of the document elements in association with the first embodiment of the present invention.

The document data 40 is comprised of document elements 41, which are structural elements, and layout information 42 for arranging the document elements on each page. As shown in FIG. 3, the document elements 41 includes a character element 411, an image (picture) element 412, a graphic element 413, a table element 414, etc., and the character element 411 in the document elements 41 is further comprised of chapters, clauses and items.

Moreover, the document data 40 herein includes document image data acquired by the image reading apparatus 20 such as a scanner, and application data created by various applications such as Word (registered trademark), Exel (registered trademark), Power Point (registered trademark).

A description will now be given of how to extract the document element 41 from the document data 40 (for example, the document image data, the application data, etc.)

First, if the document data 40 (for example, "document image data", "application data", etc.) is document image data, the document element 41 is extracted by performing an area discrimination process. The area discrimination process divides the document image data 40 into small unit areas, and extracts the document element 41 by determining attribute such as whether they are characters or pictures from features of the image of each of the divided unit areas (for example, color, shape, contour information, etc.).

Moreover, if the document data 40 is application data, the character element 411 is extracted from a character code, and the document element 41 is extracted by determining other elements (the picture (photograph) element 412, the graphic element 413, table element 414, etc.) based on the attribute information contained in the data. If there is no attribute information in the data, attribute is determined from features of the image similar to the area discrimination process of the document image in order to extract the document element 41.

Moreover, the element determination of the character element of the document element 41 such as a chapter, a clause, item, etc., is performed by a method to make determination from features of each paragraph of the document (for example, indent of a first character).

As mentioned above, the document element 41, which is a structural element, can be extracted from the document data 40 including image data and application data that have completely different data formats (for example, the document image data, the application data, etc.).

Figure 4:
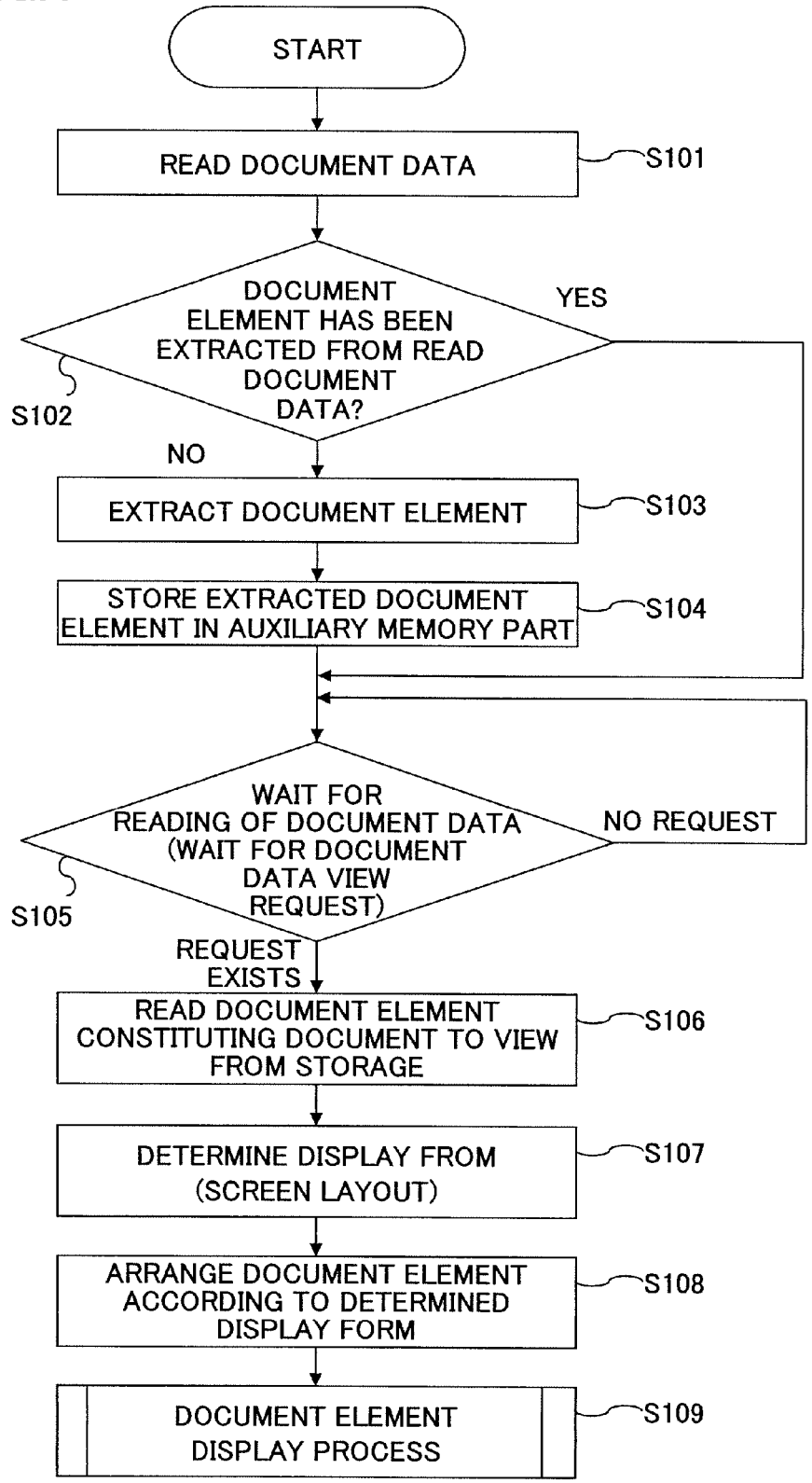
FIG. 4 is a flowchart of an entire process of the document display apparatus according to the first and second embodiments of the present invention.

A description will be given below, with reference to FIG. 4, of a flow of a process of the entire document display apparatus 10 including the extracting process of the document elements 41 which was described with reference to FIG. 3. FIG. 4 is a flowchart of the process of the entire document display apparatus 10 according to the first embodiment of the present invention.

First, the document display apparatus 10 reads (inputs) the document data 40 to view, for example, document image data, application data, etc. (step S101). Next, the document display apparatus 10 checks whether or not the document data 40 that was read (for example, document image data, application data, etc.) has been subjected to the extracting process (step S102). If the document data 40 has not been subjected to the extracting process (NO of step S102), the document display 10 performs a structure analysis on the document data 40 in order to extract the document elements 41 (step S103), and stores the extracted document elements 41 in a storage device such as the auxiliary memory unit 13, together with layout information 42 (step S104). On the other hand, if the read document data 40 has been subjected to the extracting process (YES of step S102), the document display apparatus 10 does not perform the document element extraction and the storing process on the read document data 40.

Then, the document display apparatus 10 is put in a standby state to wait for a request for the document data 40 to view (step S105). If the request for the document data 40 is not received (NO REQUEST of step S105), the document display apparatus 10 waits until a read request is received. On the other hand, if the document display 10 receives the read request (view request) for the document data 40 (REQUEST RECEIVED of step S105), the document display apparatus 10 reads the document elements 41, which constitute the document for which the read request is issued, from the storage device such as the auxiliary memory unit 13 based on the layout information 42 (step S106).

Next, the document display apparatus 10 determines the display form (screen layout) of the document data 40 (for example, document image data, application data, etc.) to view (step S107). Then, the document display apparatus 10 arranges the document elements 41 according to the determined display form (screen layout) (step S108). Finally, the document display apparatus 10 performs a document element display process (step S109).

Thus, by analyzing the document data 40 to view by using the document display program installed as an application, the document display apparatus 10 extracts the document elements 41 and arranges the extracted document elements 10 in the display format (screen layout), and displays on the display unit 14.

Figure 5:
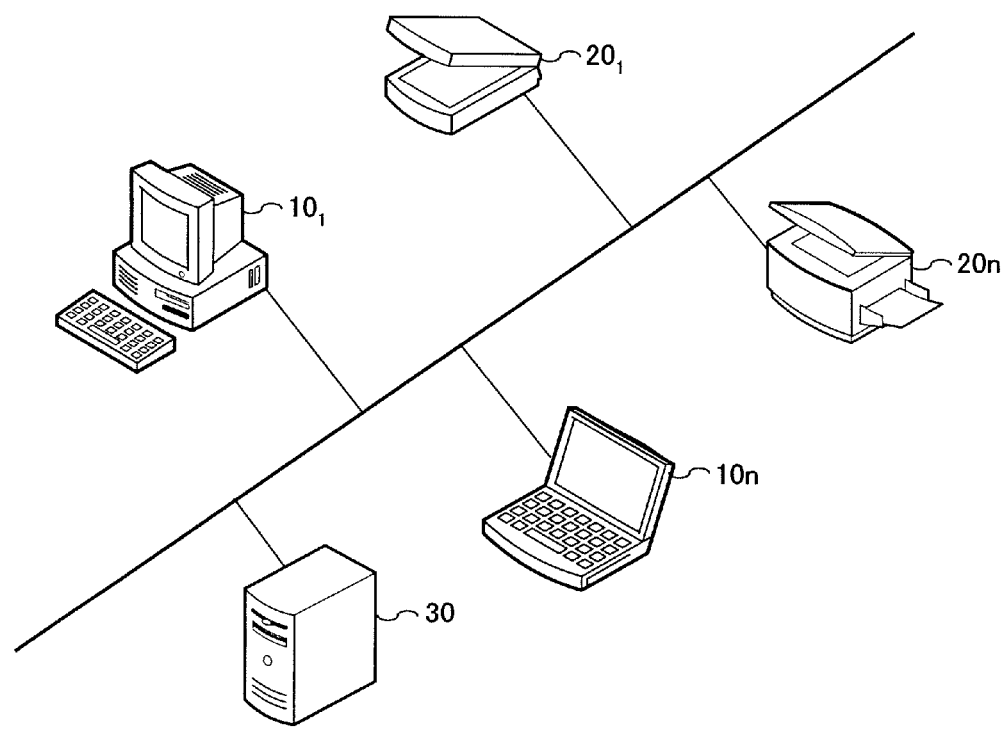
FIG. 5 is an illustration of a variation of the use environment of the document display apparatus according to the first and second embodiments of the present invention.

It should be noted that the document display function of the document display apparatus 10 can be realized by the entire process of the document display apparatus 10 described with reference to FIG. 4 even in a use environment as shown in FIG. 5 other than the use environment of the document display apparatus 10 shown in FIG. 1.

FIG. 5 is an illustration of a variation of the use environment of the document display apparatus according to the first embodiment of the present invention. In FIG. 5, a document display apparatus 10n is connected to an image reading apparatus 20n such as a scanner and a document management server 30, which manages various sets of data corresponding to document data 40 such as the document elements 41 and the layout information 42, through a network such as a LAN, a public network, radio frequency network, etc.

The document display apparatus shown in FIG. 5 may perform the process of steps S106 to S109 in the entire process of the document display apparatus 10 described with reference to FIG. 4. The process of steps S101 to S105 is performed by the document management server 30. Therefore, the document display apparatus 10n can perform the same process as FIG. 4 also in the use environment shown in FIG. 5 using the client (user terminal) server (management server) system.

Figure 6:
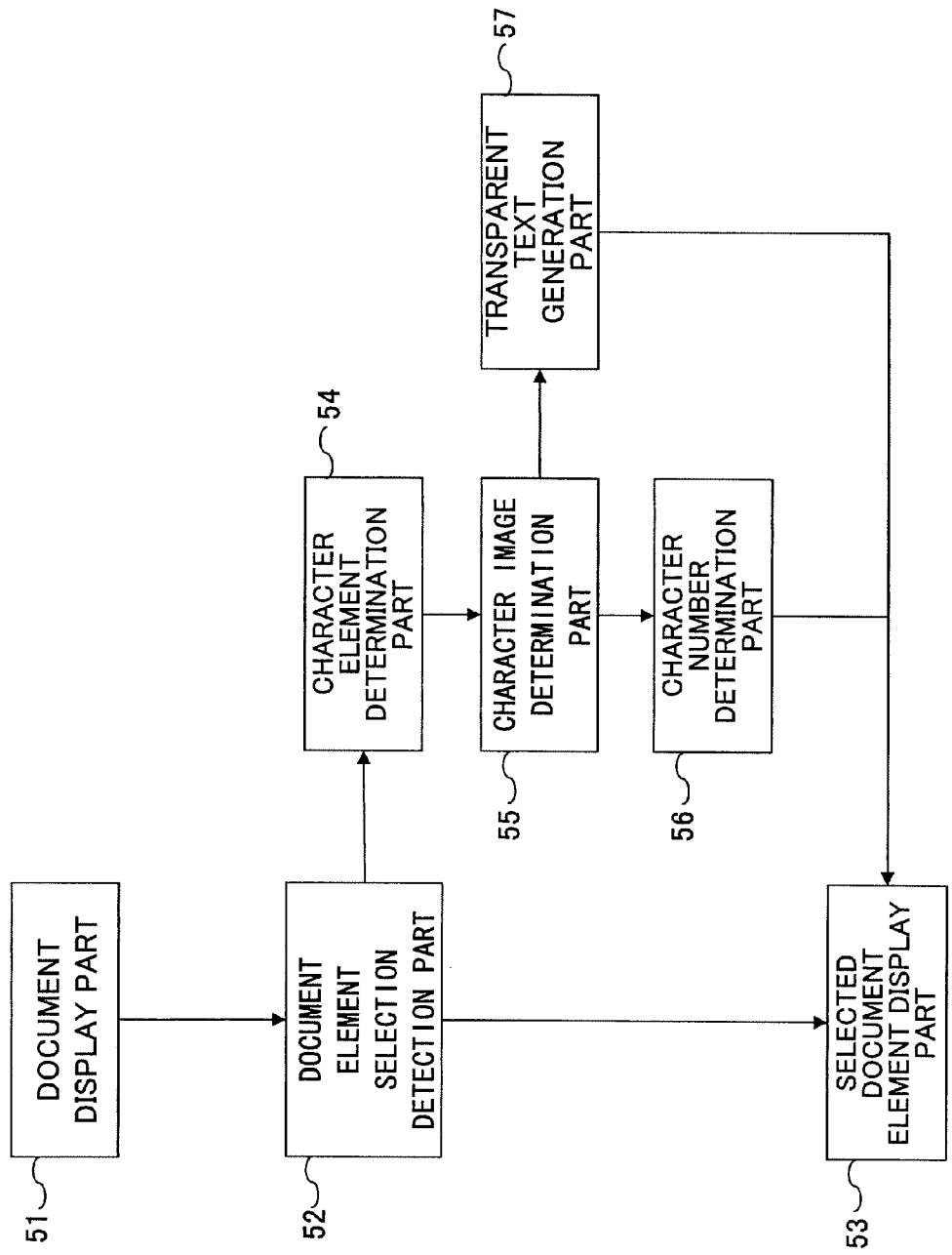
FIG. 6 is a block diagram of a part of the document display apparatus according to the first embodiment of the present invention.

Here, a description will be given, with reference to FIG. 6, of how to realize the entire process of the document display apparatus 10. FIG. 6 is a block diagram of a main part of the document display apparatus 10 according to the first embodiment of the present invention.

The main part shown in FIG. 6 includes a document display unit 51, a document element selection detection unit 52, a selected document element display unit 53, a character element determination unit 54, a character image determination unit 55, a character number determination unit 56, and a transparent text generation unit 57.

First, descriptions will be given of the document display unit 51, the document element selection detection unit 52, and the selected document element display unit 53 in that order.

The document display unit 51 displays the document elements 41 arranged according to the display form (screen layout) on the display screen of the display unit 14. The document display unit 51 arranges the document elements 41 according to the display form (screen layout), which was designed in consideration of easy viewing of the document data 40 or an arbitrary display form (screen layout) set by a user, and displays the document elements 41 in a display area (hereinafter, referred to as a first display area) on the display screen of the display unit 14.

The document element selection detection unit 52 detects that the document element 41 displayed by the document display unit 51 is selected on the display screen by the input device such as a mouse. The coordinates space of the first display area 61 and the arrangement positions of the document elements 41 are related to each other, and the document element selection detection unit 52 determines the document elements 41 to be selected. The document element selection detection unit 52 detects that the document elements were selected by reception of an input signal from the input device such as clicking a mouse.

The selected document element display unit 53 displays the document elements 41 detected by the document element selection detection unit 52 in a display area (hereinafter, referred to as a second display area) of the display screen of the display unit which displays the selected document elements 41. Moreover, the selected document element display unit 53 enlarges and displays the document elements 41 detected by the document element selection detection unit 52 in the second display area of the display screen. The selected document element display unit 53 acquires document information located in a periphery of the document elements 41 detected the document element selection detection unit 52 based on the layout information 42 acquired by the structure analysis of the document data 40 (for example, document image data, application data, etc.). Then the selected document element display unit 53 displays a part of the document information in the periphery as relevant information of the detected document elements 41 in the second display area.

Figure 7A:
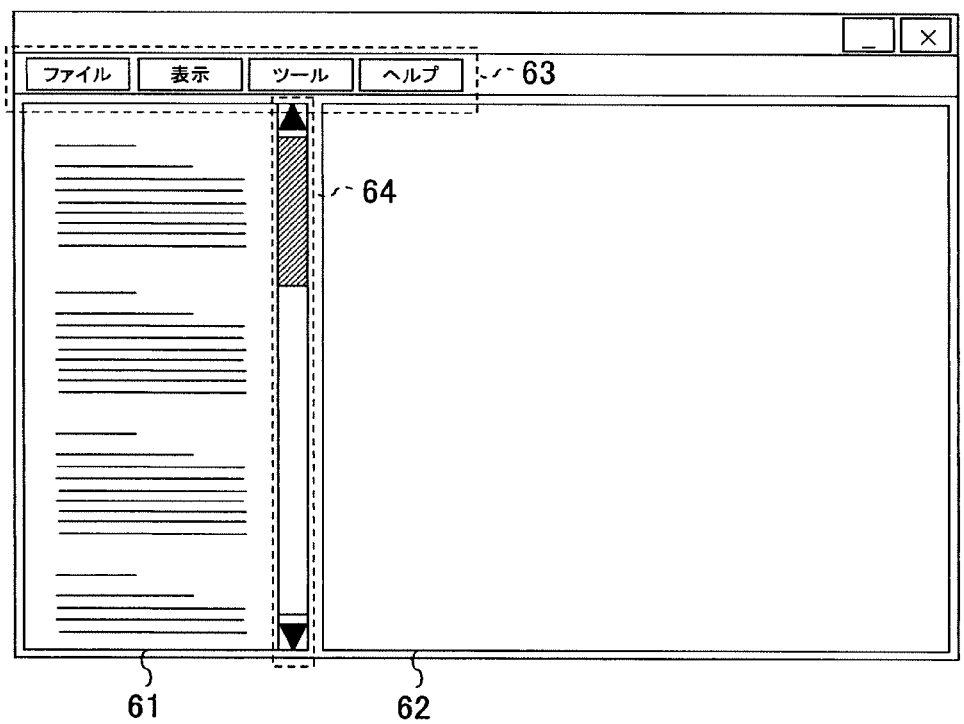
FIG. 7A is an illustration of an example of a display screen displaying a character element from among the document elements according to the first embodiment of the present invention.
Figure 7B:
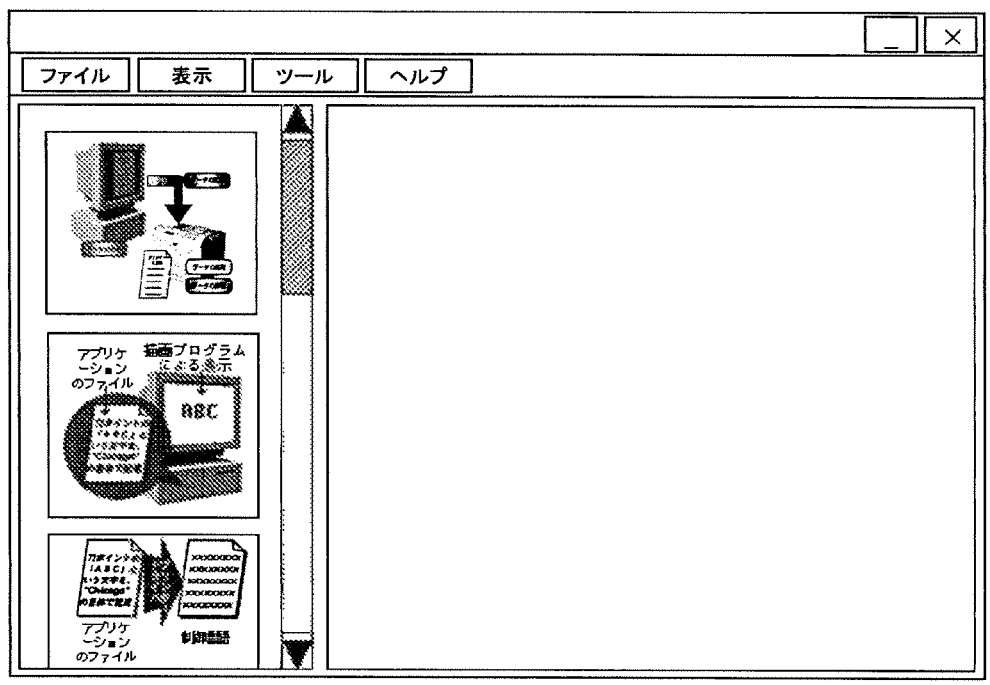
FIG. 7B is an illustration of an example of a display screen displaying a graphic element from among the document elements according to the first embodiment of the present invention.
Figure 7C:
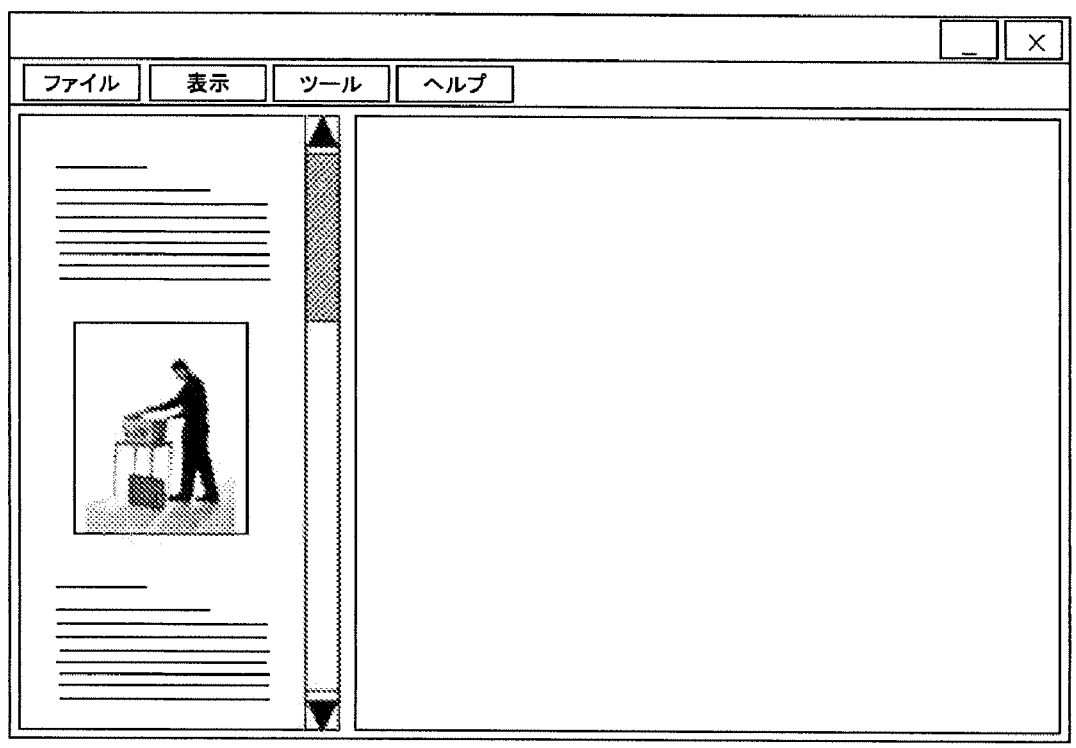
FIG. 7C is an illustration of an example of a display screen displaying an element belonging to a first chapter from among the document elements according to the first embodiment of the present invention.

A description will be given, with reference to FIGS. 7A, 7B and 7C, of examples in which the document display unit 51 arranges the document elements 41 according to the display form (screen format) and displays the document elements 41 on the display screen of the display unit 14. FIGS. 7A, 7B and 7C are illustrations of the display screen displaying the document elements 41 according to the first embodiment of the present invention.

The display screen shown in FIG. 7A has a structure in which two frames are provided in a single window. One of the two frames shown in FIG. 7A is the first display area 61, which displays the document element 41 by the document display unit 51, and is provided with a scroll bar 64 which can move the display range displayed in the first display area 61. The other frame is the second display area 62 which displays the document elements selected by the input device such as a mouse from among the document elements 41 displayed in the first display area 61. Moreover, the window is provided with menu buttons 63 corresponding to various functions of the document display application. The document display application function can be performed by selecting one of the menu buttons 63.

FIG. 7A shows the display example when only a character element 41 is arranged according to the display form (screen layout) from among the document elements 41. As shown in FIG. 7A, the character element 411 is displayed in the first display area 61 by the document display unit 51 so that the contents of the character element 411 in the document data 40 (for example, document image data, application data, etc.) can be roughly grasped using the scroll bar 64.

FIG. 7B shows the display example when only a graphic element 413 is arranged according to the display form (screen layout) from among the document elements 41. As shown in FIG. 7B, the graphic element 413 is displayed in the first display area 61 by the document display unit 51 so that the contents of the graphic element 413 in the document data 40 (for example, document image data, application data etc.) can be roughly grasped using the scroll bar 64.

FIG. 7C shows the display example when only a document element 41 belonging to a first chapter of the document data is arranged according to the display form (screen layout) from among the document elements 41. As shown in FIG. 7C, the document element 41 (character element 411 and picture element 412) belonging to the first chapter is displayed in the first display area 61 by the document display unit 51 so that the contents of the first chapter of the document data 40 (for example, document image data, application data, etc.) can be roughly grasped using the scroll bar 64.

Figure 8A:
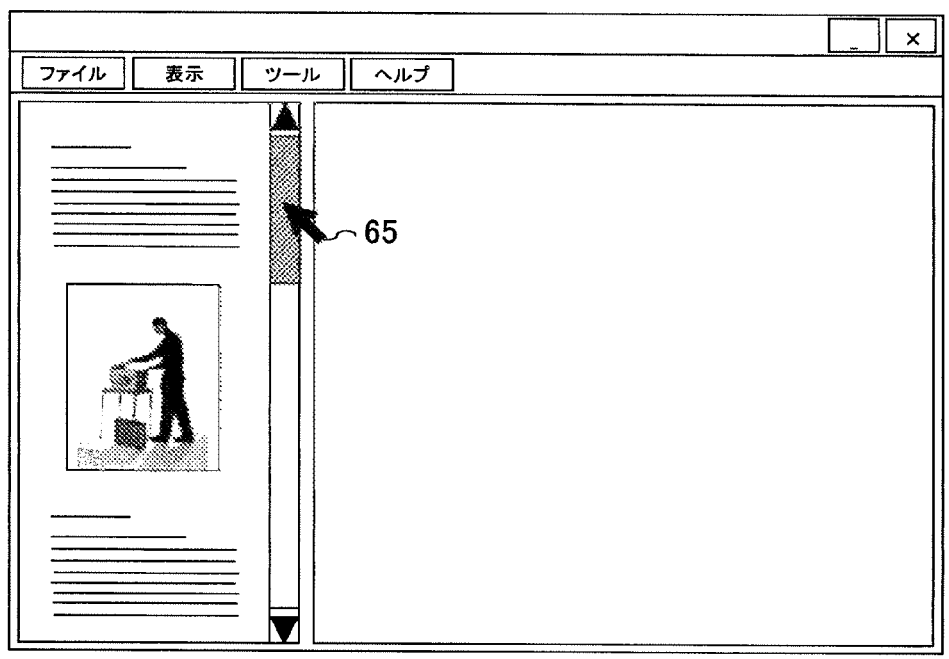
FIG. 8A is an illustration of an example of a display screen before selecting the document elements according the first embodiment of the present invention.
Figure 8B:
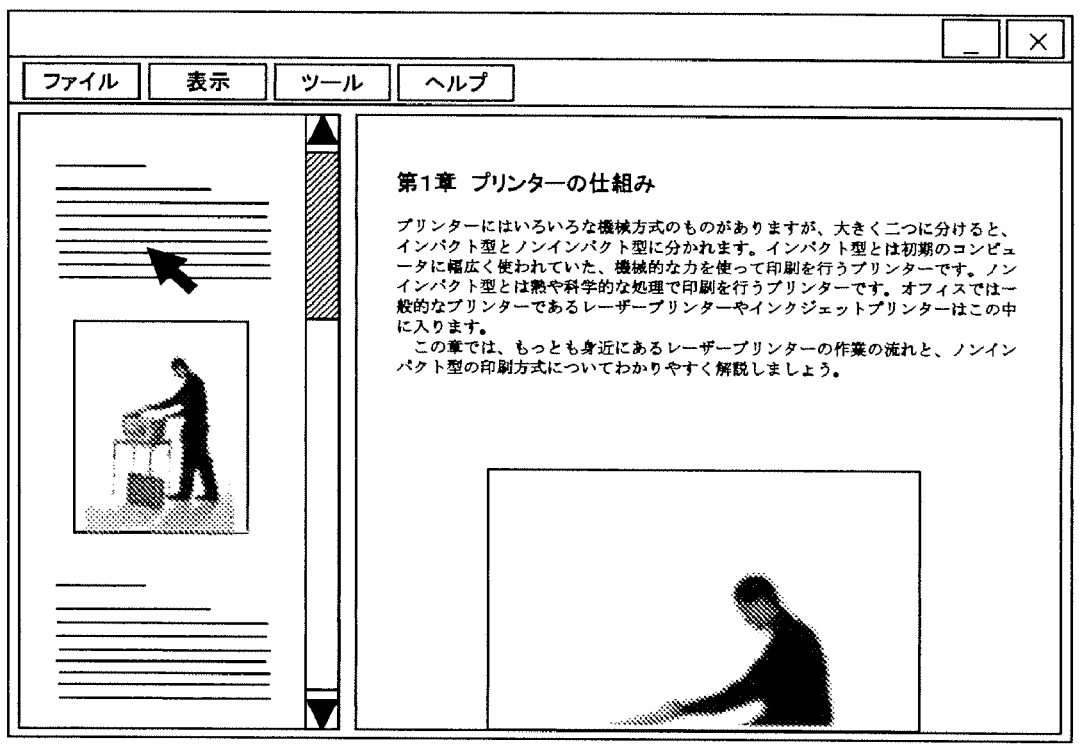
FIG. 8B is an illustration of an example of a display screen after selecting the document elements according to the first embodiment of the present invention.

FIGS. 8A and 8B are illustrations of display examples before and after the selection of the document element 41 according to the first embodiment of the present invention.

A description will be given below, of an example in which the document element selection detection unit 52 detects that the document element 41 displayed in the first display area 61 is selected on the display screen of the display unit 14 and the selected document element display unit 53 enlarged and displayed the document 41 selected by the document element selection and detection unit 52 in the second display area 62.

FIG. 8A shows a display example after the selection of the document element 41, and FIG. 8B shows a display example after the selection of the document element 41.

As shown in FIG. 8A, in order to select the document element 41 to view, the scroll bar 64 is moved by the cursor 65 of a mouse, if needed. Then, as shown in FIG. 8B, the document element 41 to view, which is displayed in the first display area 61, is selected on the display screen by using the cursor 65. Consequently, the fact that the document element 41 on the display screen is selected is detected by the document element selection detection unit 52, and the selected document element 41 is enlarged and displayed in the second display area 62 by the selection document element display unit 53. At this time, a part of the document information in the periphery of the document element 41 is displayed as relevant information of the selected document element 41 (in the case of FIG. 8B, image element 412, etc., positioned under the document element 411).

Returning to FIG. 6, a description will be given of the document element determination unit 54, the character picture determination unit 55, and the character number determination unit 56 in that order.

The character element determination unit 54 determines whether or not the document element 41 detected by the document element selection detection unit 52 is the character element 411. The character element determination unit 54 performs a structure analysis on the document data 40 (for example, document image data, application data, etc.), and determines whether the document element 41 detected by the document element selection detection unit 52 is the character element 411 based on the attribute information (for example, a type of the document element 41) at the time of extracting the document element 41.

The character picture determination unit 55 determines whether or not the character element 411 determined to be the character element 411 by the character element determination unit 54 is a character image. The character picture judging unit 55 performs a structure analysis on the document data 40, and determines whether or not the character element 411 determined to be the character element 411 by the character element determination unit 54 is a character image based on the attribute information (for example, data form regarding the character element 411) at the time of extracting the character element 411.

The character number determination unit 56 determines whether or not the character element 411, which is a character image, fits in the width of the second display area in a direction of rows (a direction of reading characters) based on a number of characters per one line when the character element 411 determined to be a character image by the character image determination unit 55 is enlarged. The character number determination unit 56 determines whether or not the number of characters per one line in the second display area 62 before enlargement is greater than a number of characters per one line in the second display area 62 after the enlargement in the character element 411 determined to be a character image by the character image determination unit 55.

A description will now be given, with reference to FIGS. 9, 10A, 10B, 11A and 11B, of an example where the selected character element 411 is enlarged and displayed in the second display area 62. In the example, the character element determination unit 54 determines whether or not the selected document element 41 is the character element 411. If the selected elements 41 is the character element 411, the character number determination unit 55 determines whether the character element 411 is a character image, the character number determination unit determines whether or not the character element 411, which is a character image, fits in a width in a direction of rows (direction of reading characters) of the second display area 62. Then, the selected document element display unit 53 enlarges and displays the selected character element 411 in the second display area 62.

Figure 9:
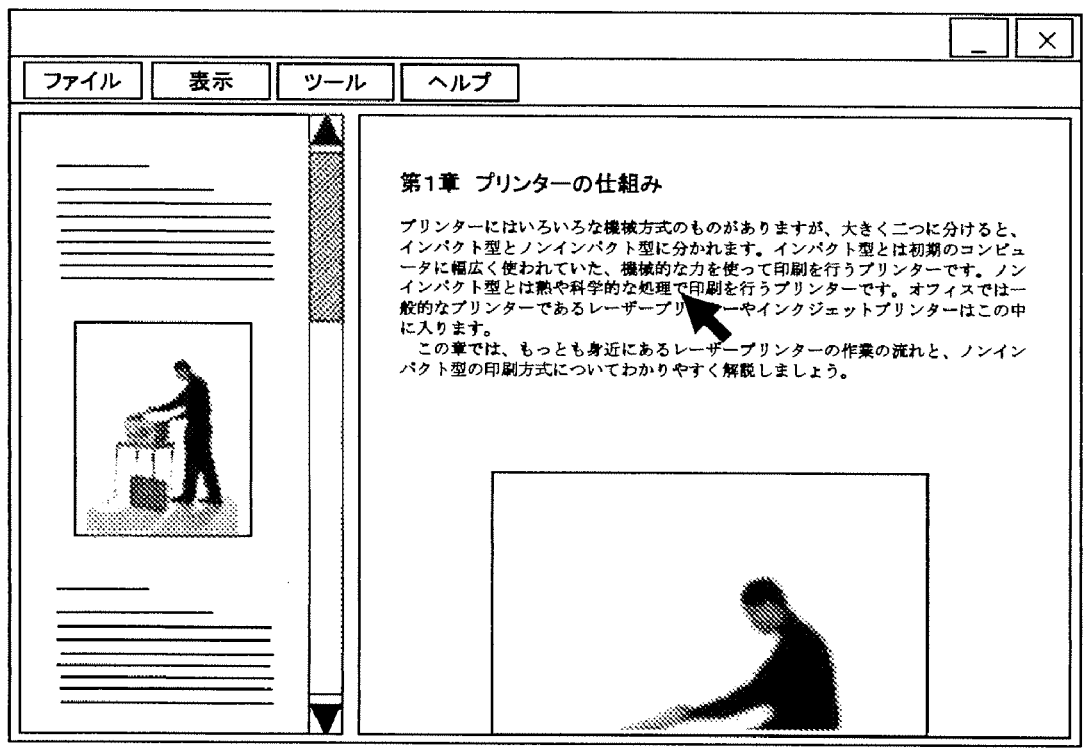
FIG. 9 is an illustration of an example of a display screen displaying an enlarged document element when the document element is selected according to the first embodiment of the present invention.

FIG. 9 shows an example of enlarged display when the document element 41 is selected according to the first embodiment of the present invention. As shown in FIG. 8B, when the document element 41 displayed in the first display area 61 is selected, the selected document element 41 is enlarged and displayed in the second display area 62. Here, if visibility of the document element 41 enlarged and displayed in the second display area 62 is degraded due to a size and resolution of the display screen of the display unit provided in the document display apparatus 10 (that is, in the case that the document element 41 is the character element 411, characters are hardly read due to limited size, or characters cannot be read as they are compressed due to low resolution), the document element 41 selected at the first time and displayed in the second display area 62 is selected again by the input device such as a mouse as shown in FIG. 9, thereby further enlarging and displaying the document element 41 at the same position in the second display area 62.

Figure 10A:
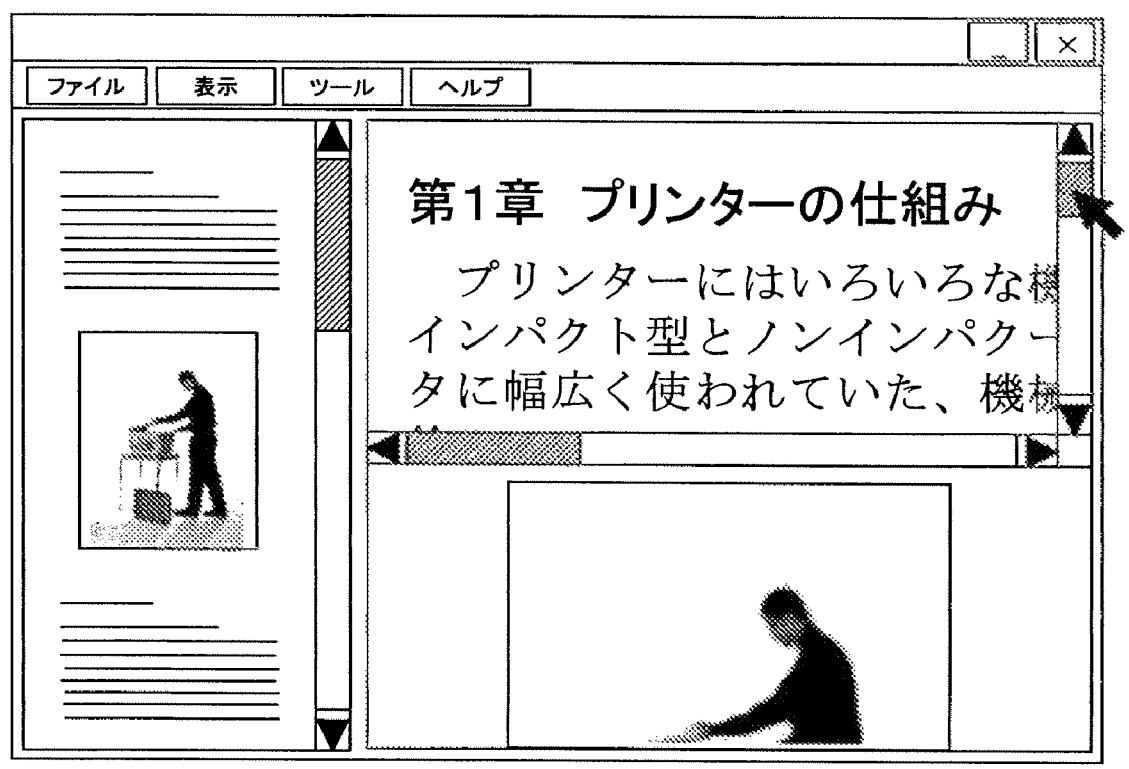
FIG. 10A is an illustration of a display screen displaying an enlarged character element enlarged according to a conventional method when the character element is selected according to the first embodiment of the present invention.
Figure 10B:
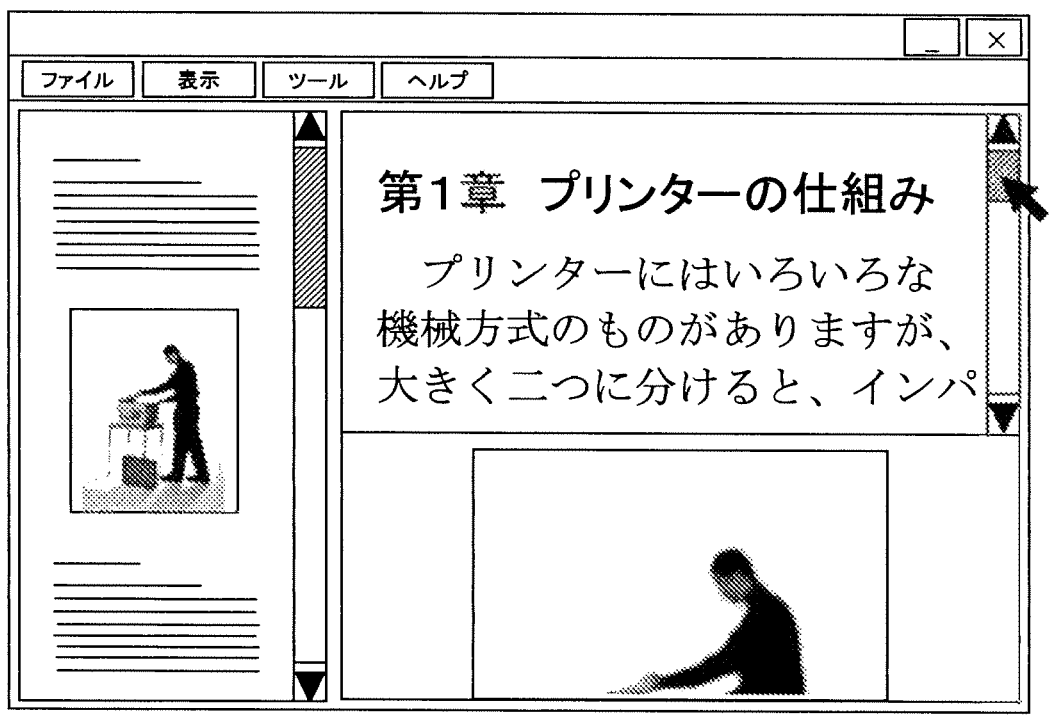
FIG. 10B is an illustration of a display screen displaying an enlarged character element enlarged according to a display method of the present invention when the character element is selected according to the first embodiment of the present invention.

FIGS. 10A and 10B show examples in which the character element 411 is further enlarged at the same position in the second display area 62 when the character element 411 is selected according to the first embodiment of the present invention. FIG. 10A is an example in which the character element 411 is enlarged and displayed by a conventional display method.

According to the conventional display method, each of the scroll bars 64 on the right side and bottom side of the second display area 62 is moved by the input device such as a mouse in order to view the contents of the document element 411. For example, when the character element 411 is a text of lateral writing, as shown in FIG. 10A, it is enlarged and displayed in the second display area 62 and the contents of the document element 411 are viewed by performing sequentially a rightward scroll, a downward scroll, a leftward scroll, a right ward scroll, a downward scroll, a leftward scroll, and so on. As mentioned above, according to the conventional display method, the contents recited in one line cannot be read easily, and it is necessary to perform up and down and left and right scroll operations when viewing. Thus, it cannot be said that operationality and visibility to view the document element is provided to a user.

Thus, the document display apparatus 10 according to the first embodiment of the present invention provides operationality and visibility to more easily view the document element to a user as compared to the conventional display method. FIG. 10B shows an example in which the document element 411 is enlarged and displayed when the document element 411 is selected.

According to the display method of the present invention, the character element determination unit 54 and the character image determination unit 55 determine that the selected document element 41 is the character element 411 and a character image. Based on a result of the determination, the character determination unit 56 determines whether or not the number of characters per one line in the second display area 62 before enlargement is greater than the number of characters per one line in the second display area 62 after enlargement even if the character element 411 is a character image. Then, if the number of characters is greater, the selected document element display unit 53 divides the character image into character strings in consideration of one character or period and comma, and folds, enlarges and displays the character element 411 to fit in the second display area 62.

For example, if the character element 411 is a text of lateral writing, the character element 411 is enlarged and displayed in the second display area as shown n FIG. 10B and it is necessary for the conventional display method to perform scroll operations of up and down and left and right. However, according to the display method of the present invention, there is no need to scroll in directions of rows (leftward and rightward), and the contents of the character element 411 can be viewed only by upward and downward scroll operations.

As mentioned above, according to the display method of the present invention, the character element 411 is enlarged and displayed by folding in order to fit in the width of rows (direction of reading characters) in the second display area 62 to acquire good visibility, while the contents of the character element 411 can be viewed without scrolling in directions of rows, which minimizes scroll operations when viewing the character element 411. In this way, the operationality and visibility to achieve easier viewing can be provided to a user as compared to the conventional display method.

A description will be given, with reference to FIGS. 11A and 11B, of a case where the selected character element 41 is character elements other than the character element 411 (for example, the picture element 412, the graphic element 413, the table element 414, etc.).

Figure 11A:
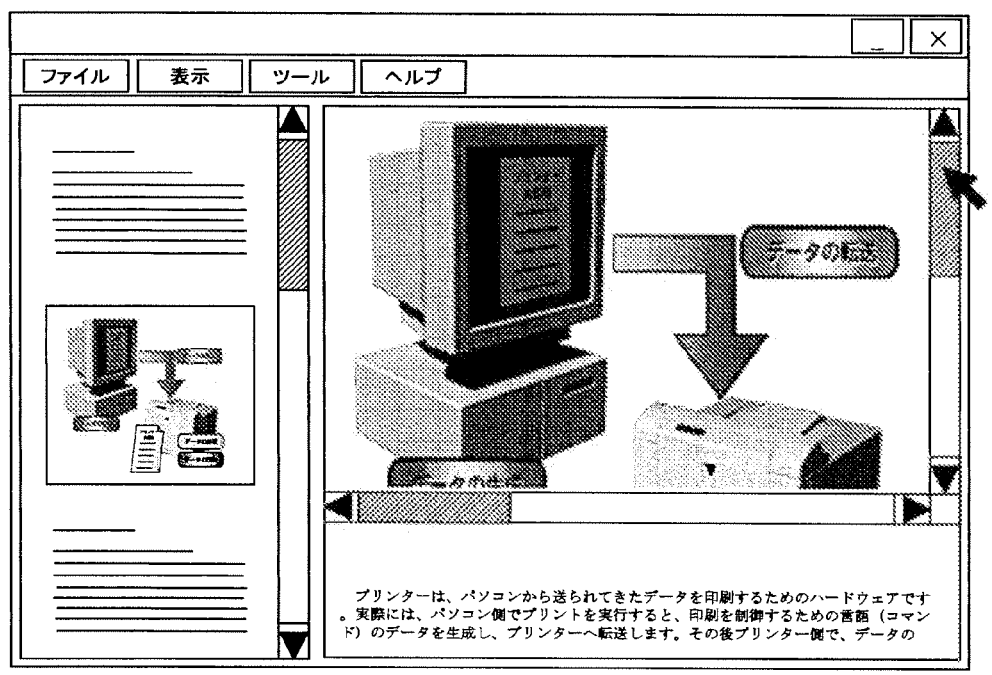
FIG. 11A is an illustration of a display screen displaying an enlarged graphic element enlarged according to a conventional method when the graphic element is selected according to the first embodiment of the present invention.
Figure 11B:
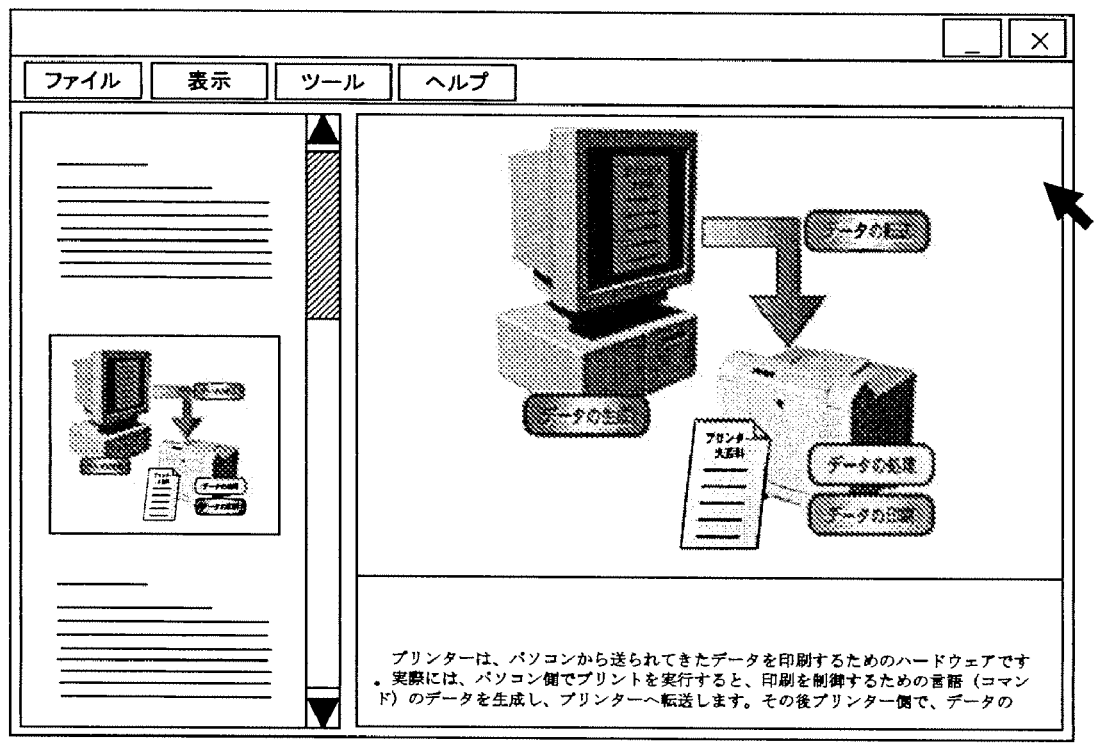
FIG. 11B is an illustration of a display screen displaying an enlarged graphic element enlarged according to a display method of the present invention when the graphic element is selected according to the first embodiment of the present invention.

FIGS. 11A and 11B show examples in which the graphic element 413 is further enlarged and displayed at the same position in the second display area 62 when the graphic element 413 is selected according to the first embodiment of the present invention.

For example, if the selected character element 41 is the graphic element 413, the graphic element 413 is enlarged and displayed in the second display area 62 as shown in FIG. 11A, and according to the conventional display method, the contents of the graphic element 413 are viewed by performing left and right scroll and up and sown scroll.

However, according to the display method of the present invention, as shown in FIG. 11B, the graphic element 413 is compressed into a region which can be maximum displayed in the second display area 62 in consideration of the width and height of the second display area 62 by the selected document element display unit 53. In this way, the contents of the graphic element 413 can be viewed without up and down and left and right scroll operations while acquiring good visibility, and operationality and visibility to achieve easier viewing can be provided to a user as compared to the conventional display method.

Returning to FIG. 6, the transparent text generation unit 57 generates a transparent text from image data by performing a character recognition process using an optical character reader or the like on the character image which is determined to be the character element 411 by the character element determination unit 54 and the character element 411 is determined to be a character image by the character image determination unit 54.

Figure 12:
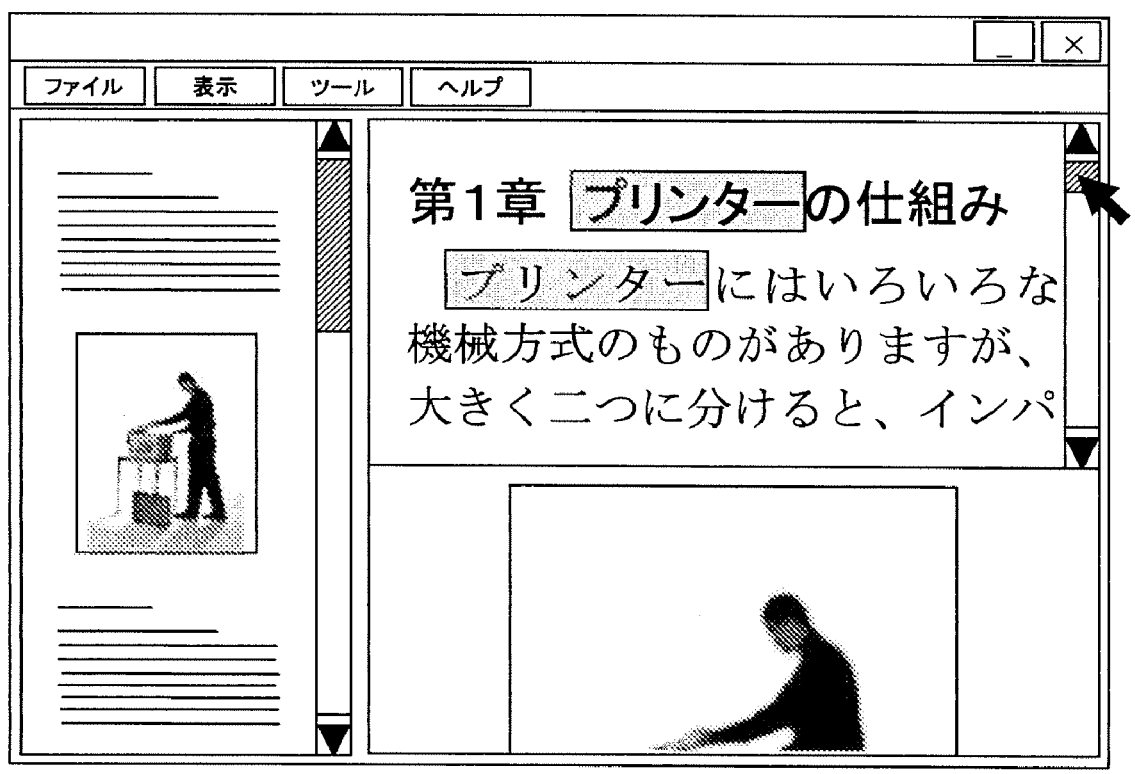
FIG. 12 is an illustration of a display screen when text search is performed on the character element according to the first embodiment of the present invention.

A description will be given below, with reference to FIG. 12, of an example in which a transparent text generated by the transparent text generation unit 57 is superimposed onto the character element 411 by the selected document element display unit 53, and is enlarged and displayed. FIG. 12 shows a display example when text search is performed on the character element 411 according to the first embodiment of the present invention.

If one wants to view information regarding a designated search word in searching the document element 411 with an arbitrary search word, the search cannot be done when the selected character element 411 is a character image. Therefore, a transparent text is generated from the character image by the transparent text generation unit 57, and the generated transparent text is superimposed onto the original character image by the selected character element display unit 53 and displayed in order to enable the text search. In FIG. 12, the result of the text search performed on the character element 411 with a search word "printer" (in Japanese language) is displayed by a solid line frame with screening. Thus, the document display apparatus 10 arranges the document element 41 by the document display unit 51 according to the display form (screen layout), and displays it in the first display area 61 of the display screen of the display unit 14.

Next, the document display apparatus 10 detects by the document element selection detection unit 52 that the document element 41 displayed in the first display area 61 is selected. Then, the document display apparatus 10 enlarges and displays by the selected document element display unit 53 the document element 41 which is detected by the document element selection detection unit 52 in the second display area 62 of the display screen of the display unit 14. When enlarging an displaying the selected document element 41 in the second display area 62, the document display apparatus 10 determines whether or not the selected document element 41 is the character element 411 by using the document element determination unit 54. If the selected document element 41 is the character element 411, the document display apparatus 10 determines by the character image determination unit 55 whether or not the character element 411 is a character image. If the character element 411 is a character image, the document display apparatus 10 determines by the character number determination unit 56 whether or not the character element 411, which is a character image, fits in a width of the second display area 62 in a direction of rows when enlarging the character element 411 determined to be a character image by the character number determination unit 56.

Next, if it is determined by the character number determination unit 56 that the character element 41 does not fit in the second display area 62, the document display apparatus 10 divides by the selected document element display unit 53 the character image of the selected character element 411 into a plurality of characters in consideration of period and comma, and enlarges and displays the character image so that the character image fits in the width of the second display area 62 in the direction of rows (direction of reading characters).

Moreover, the document display apparatus 10 determines by the character element selection unit 54 whether or not the selected document element 41 is the character element 411, and if the selected document element 41 is the document element 41 other than the character element 411 (for example, a graphic element, a table element, a picture element, a ruled line element, etc.), the document display apparatus 10 compresses and displays by the selected document display unit 53 the selected document element 41 in the second display area 62 in consideration of the width and height of the second display area 62 so that the document element 41 is compressed into a range where it can be displayed at maximum (a range where the entire document element 41 fits in).

Moreover, the document display apparatus 10 displays by the selected document element display unit 53 a part of document information (for example, adjacent document element 41, etc.) positioned in the periphery of the document element 41 as relevant information of the selected document element 41 in the second display area 62 together with the selected document element 41.

Moreover, if it is determined by the character image determination unit 56 that the selected character element 411 is a character image, the document display apparatus generates a transparent text by the transparent text generation unit 57, and enlarges and displays by the selected document element display unit 53 the character element 411 and the transparent text by superimposing the transparent text onto the character element 411.

A description will be given, with reference to FIG. 13 through FIG. 15, of the process of the document display apparatus 10, which was explained with reference to FIG. 4 and FIG. 6 through FIG. 12.

Figure 13:
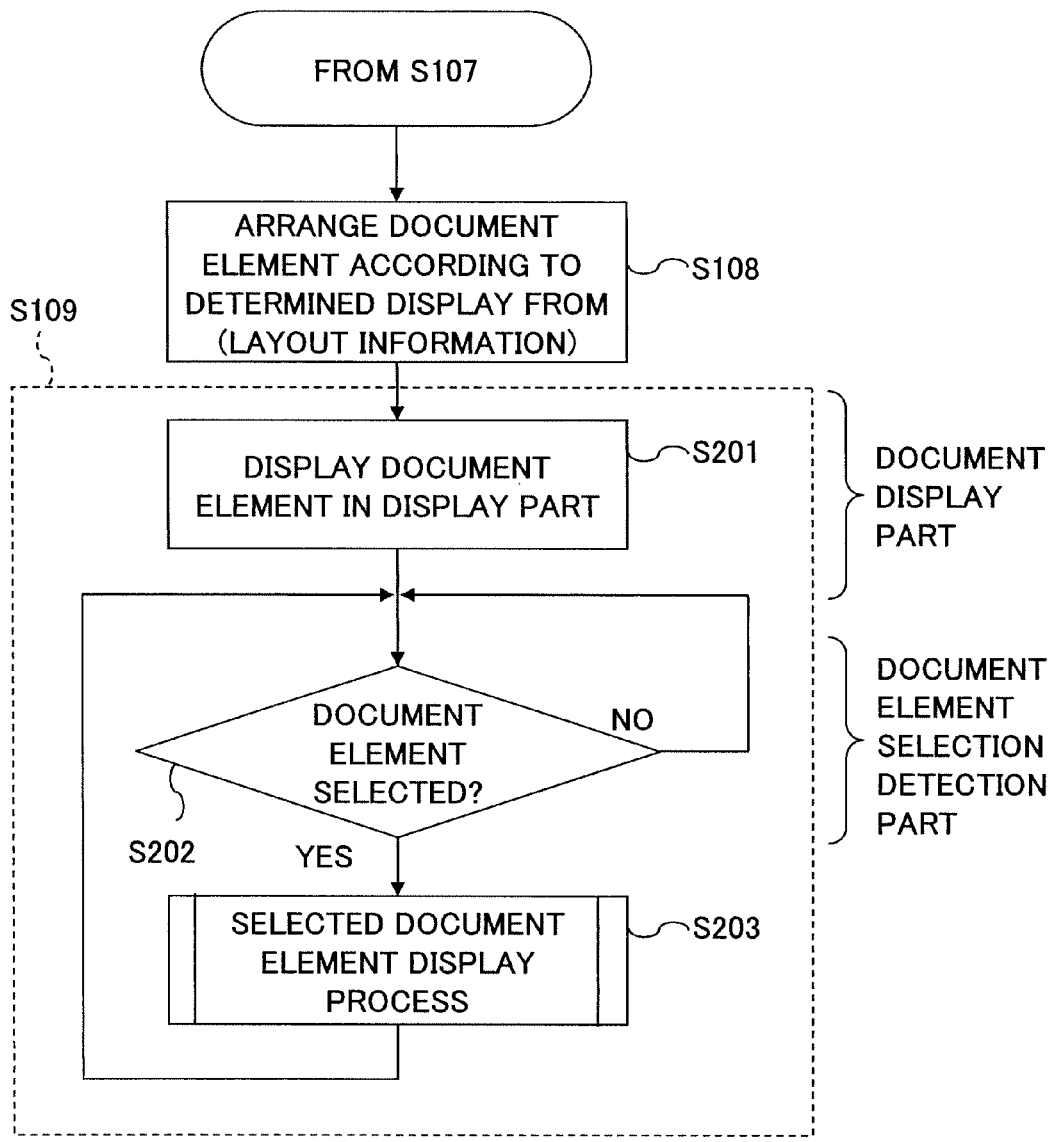
FIG. 13 is a flowchart of a process before displaying the selected document element according to one embodiment of the present invention.

FIG. 13 is a flowchart showing a flow of the process to the display of the selected document element 41 is displayed is performed according to the first embodiment of the present invention. The process shown in FIG. 13 is for illustrating the document element display process of step S109 in the entire process of the document display apparatus 10 described with reference to FIG. 4. The document display apparatus 10 displays the document element 41 arranged by the document display unit 51 in the first display area 61 of the display screen of the display unit 14 (step S201). Next, the document display apparatus 10 determines by the document element selection detection unit 52 whether or not the document element 41 displayed in the first display area 61 is selected by the input device such as a mouse (step S202). If it is not determined by the document element selection detection unit 52 that the document element 41 is selected (NO of step S202), the process is continued in order to wait for detection of the fact that the document element 41 is selected. On the other hand, if it is determined by the document element selection detection unit 52 that the document element 41 is selected (YES of step S202), the document display apparatus 10 performs a selected document element display process (step S203).

Figure 14:
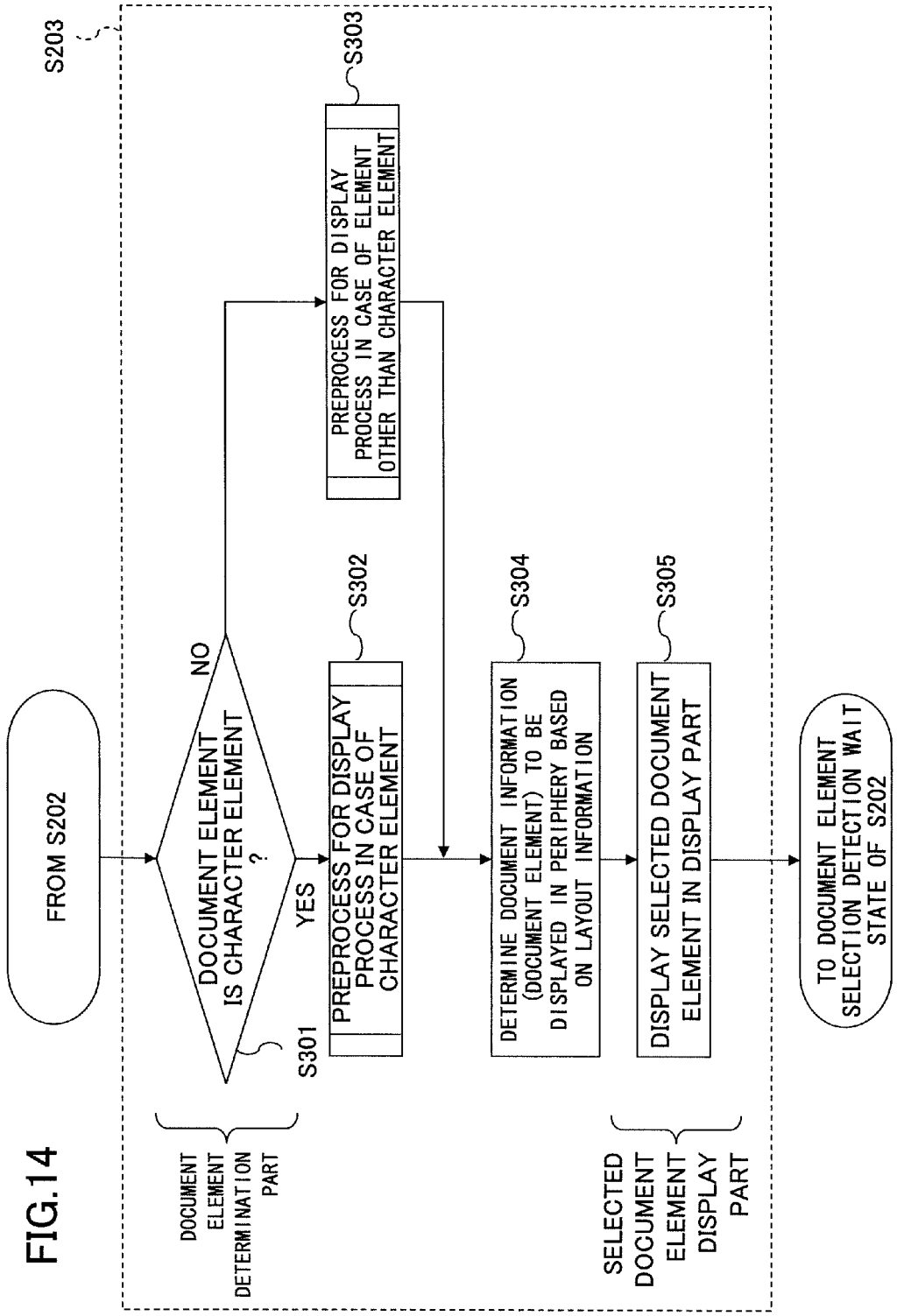
FIG. 14 is a flowchart of a display process of the selected document element according to one embodiment of the present invention.

FIG. 14 is a flowchart showing a display process of the selected document element 41 according to the first embodiment of the preset invention. The process shown in FIG. 14 is for illustrating the selected document element display process of step S203 in the process of displaying the selected document element explained with reference to FIG. 13. The document display apparatus 10 determines by the character element determination unit 54 whether or not the document element 41 detected by the document element selection detection unit 52 is a character element (step S301). If the character element determination unit 54 determines that the detected document element 41 is the character element 411 (YES of step S301), the document display apparatus 10 performs a preprocess (for example, a transparent text generating process, a folding process, etc.) in the display process of the character element 411, which the character element determination unit 54 determined (step S302).

On the other hand, if the character element determination unit 54 determines that the detected document element 41 is a character element 41 (for example, the picture element 412, the graphic element 413, the table element 414, etc.) other than the character element 411 (NO of step S301), the document display apparatus 10 performs a preprocess (for example, a compression process, etc.) in the display process of the document element 41 other than the character element 411 which the document element determination unit 54 determined (step S303).

After the document display apparatus 10 performs the preprocess on the document element 411 and the document element 41 other than the character element 411 (for example, the picture element 412, the graphic element 413, the table element 414, etc.), the document display apparatus 10 acquires the document information positioned in the periphery of the document element 41 detected by the document element selection detection unit 52 based on the layout information acquired by the structure analysis of the document data 40 (for example, the document image data, the application data, etc.), and determines the document information (for example, the adjacent document element 41, etc.) to be displayed in a periphery of the document element 41 detected by the document element selection detection unit 52 (step S304). Then, the document display apparatus 10 displays the document element 41 detected by the document element selection detection unit 52 in the second display area 62 together with a unit of the determined document information in the periphery (for example, the adjacent document element 41, etc.) (step S305). Finally, the document display apparatus 10 returns to the state of waiting for the document element selection detection in step S202 again.

Figure 15A:
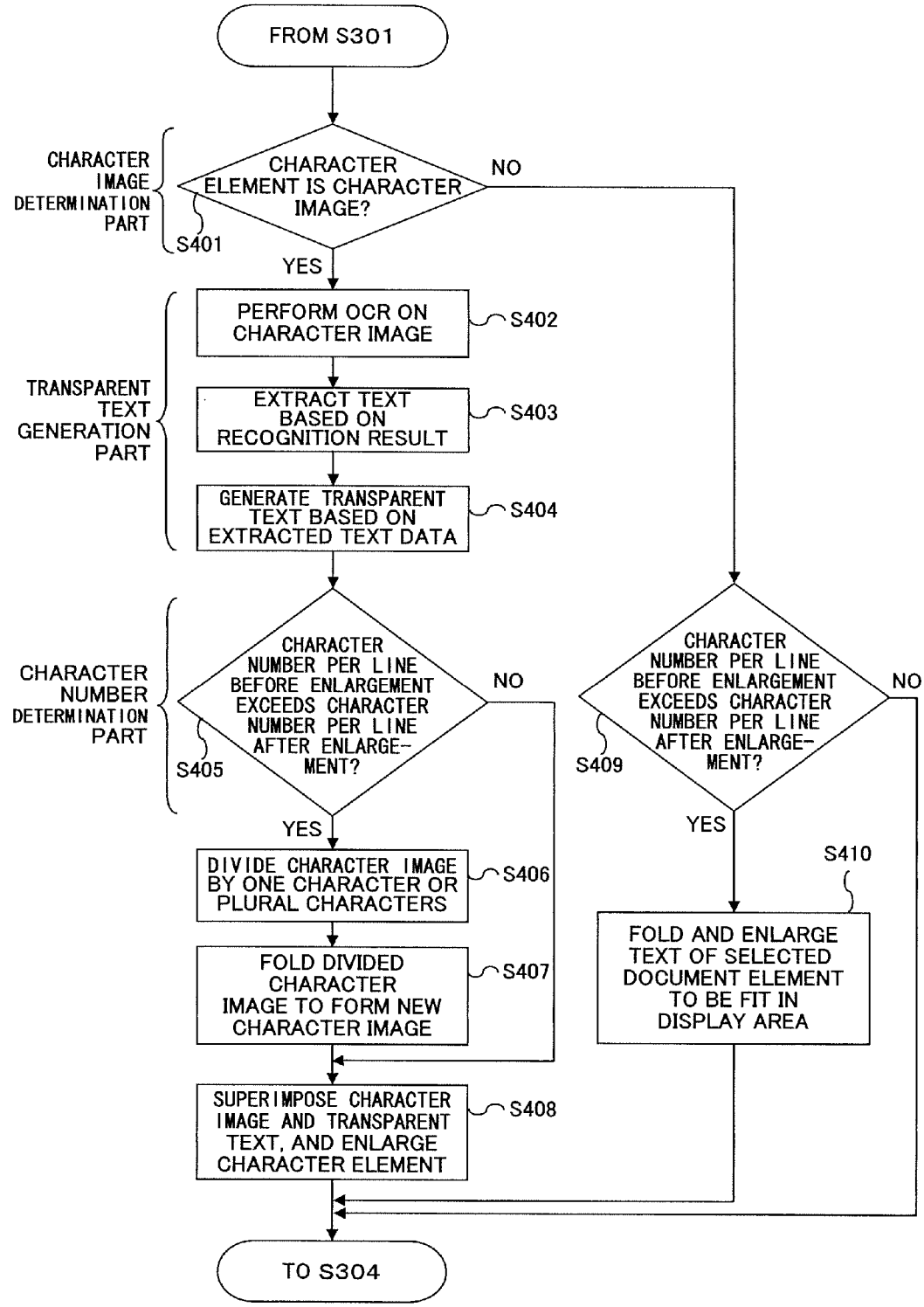
FIG. 15A is a flowchart of a preprocess of the selected document element according to one embodiment of the present invention.
Figure 15B:
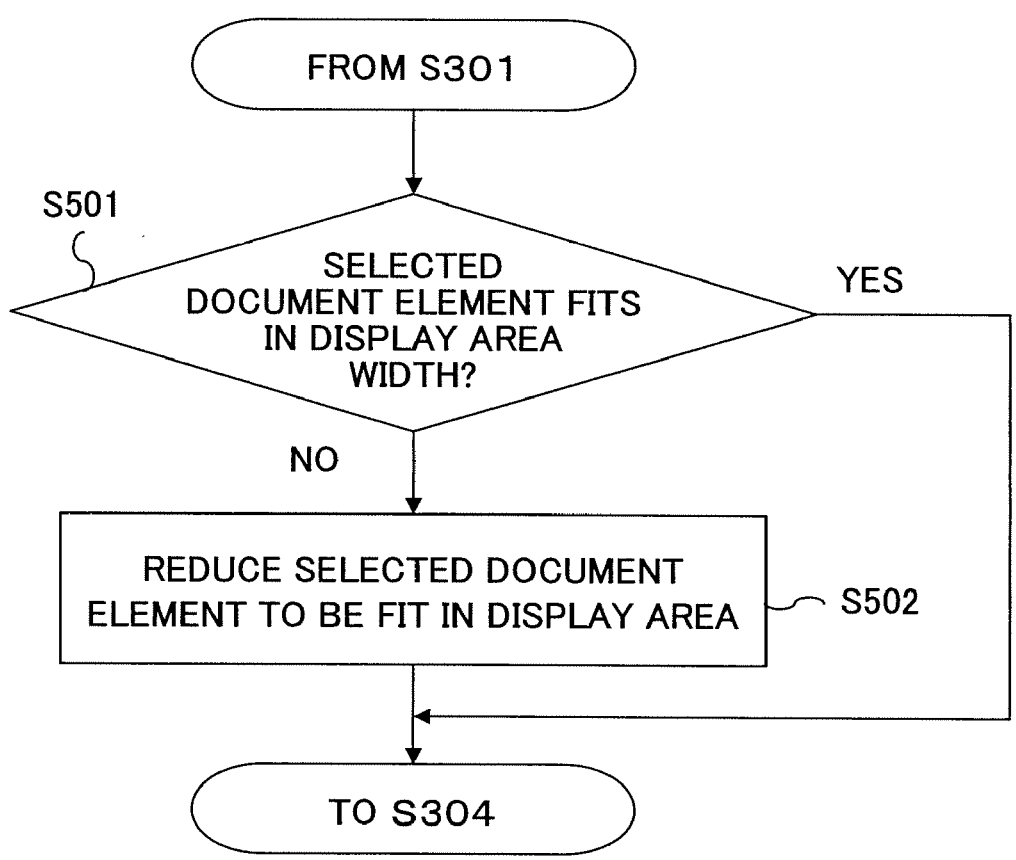
FIG. 15B is a flowchart of a preprocess in a display process of the document elements other than the character element according to the first embodiment of the present invention.

FIGS. 15A and 15B are flowcharts showing the preprocess (for example, the transparent text generating process, the folding process, etc.) in the display process of the document element 41 according to the first embodiment of the present invention. FIG. 15A shows a flowchart of the preprocess in a case of the character element 411 from among document elements 41. FIG. 15B shows a flowchart of the preprocess in a case of the document element 41 other than the character element 411 from among the document elements 41.

The process shown in FIG. 15A is for illustrating the preprocess of step S302 (for example, the transparent text generating process, the folding process, etc.) in the display process of the selected document element 41 explained with reference to FIG. 14. The document display apparatus 10 determines by the character image determination unit 55 whether or not the character element 411 determined by the character element determination unit 54 is a character image (step S401). If the character image determination unit 55 determines that the character element 411 is a character image (YES of step S401), the document display apparatus 10 performs by the transparent text generation unit 57 a character recognition process on the character image concerned by using an OCR or the like (step S402). Next, the document display apparatus 10 extracts character data (text data) from the character image by the transparent text generation unit 57 based on the result of the character recognition process (step S403). Then, the document display apparatus 10 generates the transparent text by the transparent text generation unit 57 based on the extracted character data (text data) (step S404).

Then, the document display apparatus 10 determines by the character number determination unit 56 whether the number of characters per one line before the enlarged display is greater than the number of characters per one line after the enlarged display with respect to the character image of the character element 411 detected by the document element selection detection unit 52 (step S405). If the character number determination unit 56 determines that the number of characters per one line before the enlarged display is greater than the number of characters per one line after the enlarged display (YES of step S405), the document display apparatus 10 divides the character image into a plurality of units of characters in consideration of period and comma (step S407). Then, the document display apparatus 10 folds the character image, which is divided into a plurality of units of characters in consideration of a single character of period and comma, so that the character image fits in the width of the second display area 62 in the direction of rows (direction of reading characters), and constitutes a new character image (step S407).

On the other hand, if the character number determination unit 56 determines that the number of characters per one line before the enlarged display is equal to or smaller than the number of characters per one line after the enlarged display (NO of step S405), the document display apparatus 10 does not perform the process of step S406 and S407.

Then, the document display apparatus 10 superimposes the character image and the transparent text generated by the transparent text generation unit 57, and enlarges the character element 41, and, then, the preprocess of the display process in the case of the character element 41 being a character image is ended (step S408).

If the character image determination unit 55 determines that the character element 411 is not a character image (NO of S401), the character element 411 is not a character image but character data (text data), and, thus, the document display apparatus 10 determines via the character number determination unit 56 whether of not the number of characters per one line before enlarged display is greater than the number of characters per one line after enlarged display with respect to the character data (text data) of the character element 411 detected by the document element selection detection unit 52 (step S409).

If the character number determination unit 56 determines that the number of characters per one line before enlarged display is greater than the number of characters per one line after enlarged display (YES of S409), the document display apparatus 10 folds the character data (text data) of the character element 411 detected by the document element selection detection unit 52 in order to fit in the width of the second display area 62 in the direction of rows (direction of reading characters), and the preprocess of the display process in the case of the document element 411 being character data (text data) is ended (step S410).

On the other hand, if the character number determination unit 56 determines that the number of characters per one line before enlarged display is equal to or smaller than the number of characters per one line after enlarged display (NO of S409), the document display apparatus 10 does not perform the process of step S410, and the preprocess of the display process in the case of the document element 411 being character data (text data) is ended.

Next, the process of the document display apparatus 10 proceeds to the process of step S304 to determine the document information (for example, the adjacent document element 41, etc.) relevant to the selected document element 41 based on the layout information 42 on FIG. 14.

The process shown in FIG. 15B is for illustrating the preprocess of step S303 in the display process of the document element 41 (for example, the picture element 142, the graphic element 413, the table element 414, etc.) other than the character element 411 in the display process of the selected document element 41 explained with reference to FIG. 14.

The document display apparatus 10 determines whether or not the document 41 fits within the second display area 62, if the document element 41 other than the character element 411 (for example, the picture element 412, the graphic element 413, the table element 414, etc.) is enlarged (step S501). If the document element 41 other than the character element 411 (for example, the picture element 412, the graphic element 413, the table element 414, etc.) does not fit in the second display area 62 when they are enlarged and displayed (NO of S501), the document display apparatus 10 compresses the document element 41 other than the character element 411 so that they can be displayed at a maximum size in the second display area 62 of the display screen of the display unit 14, and, then, the preprocess of the display process in the case of the document element 41 other than the character element 411 is ended (step S502).

If the document elements 41 other than the character element 411 (for example, the picture element 412, the graphic element 413, the table element 414, etc.) fit in the second display area 62 when it is enlarged and displayed (YES of S501), the document display apparatus 10 does not perform the process of step S502, and the preprocess of the display process in the case of the document element 41 other than the character element 411 (for example, the picture element 412, the graphic element 413, the table element 414, etc.) is ended. Then, the process of the document display apparatus 10 proceeds to the process of S304.

As mentioned above, according to the first embodiment of the present invention, the document display apparatus 10 can arrange the document element 41 according to display form (screen layout) by the document display unit 51, and can display the document element 41 in the first display area 61 of the display screen of the display unit 14. Thereafter, the document display apparatus 10 detects by the document element selection detection unit 52 that the document element 41 displayed on the first display area 61 is selected, and can enlarge and display by the selected document element display unit 53 the document element 41 selected by the document element selection detection unit 52 in the second display area 62 of the display screen of the display unit 14. Therefore, when viewing a document, the document display apparatus 10 can select the contents to be viewed in the first display area 61 on an individual document element basis, which realizes operationality providing easy viewing, and the contents which a user wants to view can be distinguished from document information other than the contents which the user wants to view, and visibility providing easy viewing can be realized.

Additionally, the document display apparatus 10 determines by the character element determination unit 54 whether or not the selected document element 41 is the character element 411 when displaying the selected element 41 in the second display area 62. If the selected document element 41 is the character element 411, the document display apparatus 10 determines by the character image determination unit 55 whether or not the character element 411 is a character image. If the character element 411 is a character image, the document display apparatus 10 determines by the character number determination unit 56 whether or not the character element, which is a character image, fits in the width of the second display area 62 in the direction of rows (direction of reading characters) if the document element 411 determined as a character image is enlarged and displayed.

Then, if the character number determination unit 56 determined that it cannot fit in the second display area 62, the document display device 10 divides the character image of the selected document element 411 into a plurality of characters by the selected document element display unit 53, and can enlarge and display the character image to fit in the width of the second display area 62 in the direction of rows (direction of reading characters) by folding the character image. Therefore, the document display apparatus 10 can display the contents of the document with a minimum scroll operation while maintaining good visibility by the enlarge display.

Moreover, the document display apparatus 10 determines whether the selected document element 41 is the character element 411 by the character element selection unit 54. If the selected document element 41 is the document element 41 other than character element 411 (for example, the graphic element, the table element, the picture element, the ruled line element, etc.), the document display apparatus 10 compressed and displays by the selected document element display unit 53 the selected document element 41 in the second display area 62 in a range at a maximum display size (a range in which the entire document element 41 fits) in consideration of the width and height of the second display area 62 in the case where the document element 41 does not fit in the second display area 62 when enlarging the selected document element 41. Therefore, the document display apparatus 10 can display graphics, tables, images, etc., in their entirety without a scroll operation.

Moreover, the document display apparatus 10 can display by the selected document element display unit 53 a part of the document information (for example, adjacent document element 41, etc.) positioned in the periphery of the document element 41 as relevant information of the selected document element 41 in the second display area 61 together with the selected document element 41. Therefore, the document display apparatus 10 permits to grasp the document information relevant to the contents thereof simultaneously with the contents to view.

Moreover, if the character image determination unit 56 determines that the selected character element 411 is a character image, the document display apparatus 10 generates a transparent text by the transparent text generation unit 57, and enlarges and displays the character element 411 and the transparent text by the selected document element display unit 53 by superimposing the transparent text onto the document element 411. Therefore, the document display apparatus 10 can perform text search even if the document element 411 corresponding to the contents to view is a character image. Thus, the document display apparatus 10 can realize operationality and visibility with which a user can easily view the contents of the document data 40 (for example, document image data, application data, etc.).

Although descriptions of the present invention were given based on the first embodiment of the present invention, the PC serving as the above-mentioned document display apparatus 10 is an example of a document display apparatus according to one embodiment of the present invention, and the present invention is not limited to the specifically disclosed document display apparatus 10. For example, although a mobile terminal such as a cellular phone or a PDA does not have the auxiliary storage unit 13 (HD) and the storage media drive 18 shown in FIG. 2, the same process can be performed if various kinds of data such as the document data 40 (for example, document image data, application data, etc.), the document element 41, the layout information 42, etc., are stored in an external storage device such as a memory card.

Moreover, the mouse mentioned in the above-mentioned embodiment is an example of the input device, which is a pointing device, and the present invention is not limited to that. For example, a cursor key or an enter key of a keyboard may be used.

Figure 16A:
FIG. 16A is an illustration showing a display screen displaying the document element provided with background color according to the first embodiment of the present invention.
Figure 16B:
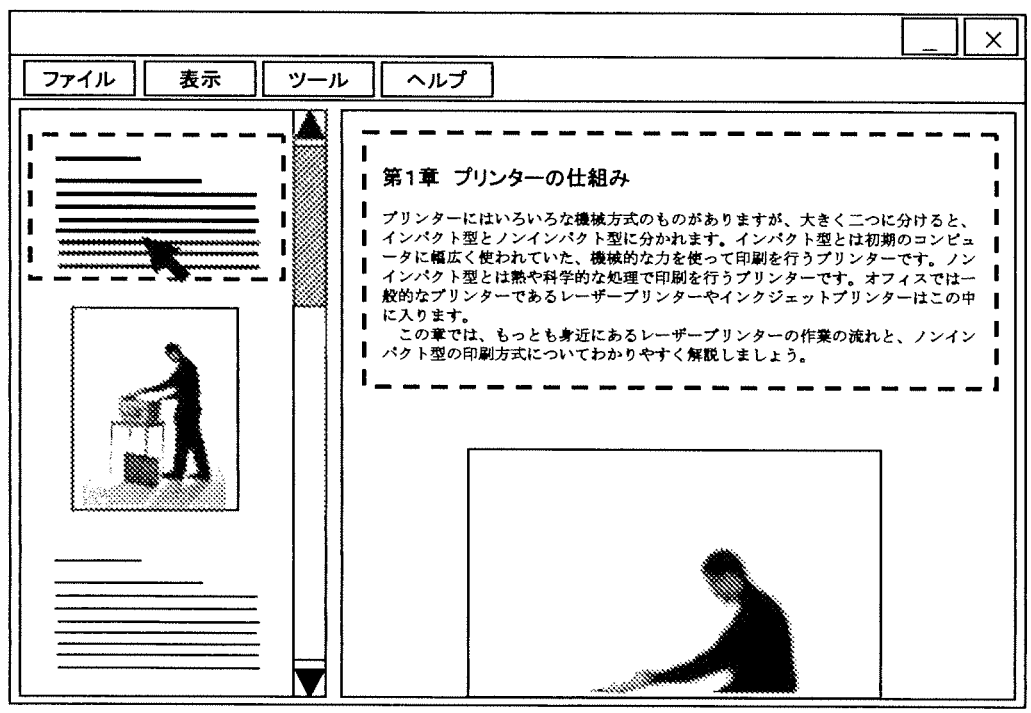
FIG. 16B is an illustration showing a display screen displaying the document element provided with a dotted-line frame according to the first embodiment of the present invention.

Moreover, the display examples (such as shown in FIG. 9) by the selected document element display unit 53 explained in the above mentioned embodiment are merely examples of display, and the present invention is not limited to those. That is, a display may be provided so that the selected document element 41 can be clearly distinguished from non-selected document elements 41 by the selected document element display unit 53. For example, there may be a variation in which color which does not interfere with the display of the document element 41 may be provided on the background of the selected document element 41 such as shown in FIG. 16A. Additionally, there may be a variation in which a dotted line frame is provided to the selected document element 41 such as shown in FIG. 16B.

Figure 17:
FIG. 17 is an illustration showing a display screen displaying document data of vertical writing according to the first embodiment of the present invention.

Moreover, the display examples by the document display unit 51 mentioned in the above-mentioned embodiment are merely examples of display, and the present invention is not limited to those examples. That is, the screen layout may be changed by the document display unit 51 in response to the document data 40 to view, such as, for example a variation in which the document data 40 (for example, document image data, application data, etc.) of a document type of vertical writing shown in FIG. 17 is displayed.

Moreover, in the display examples by the document display unit 51 mentioned in the above-mentioned embodiment (FIG. 7, etc.), the screen layout arrangement having two frames in one window is one example of screen lay out arrangement, and the present invention is not limited to that example. That is, the document element 41 may be arranged by the document display unit 51 in a screen layout arrangement by which the document element 41 can be easily viewed in response to a size of the display screen. For example, there is a variation of the screen layout arrangement having one frame in one window such as shown in FIG. 18A. It should be noted that FIG. 18B shows a variation in which the window of the second display area 62, which is different from the first display area 61, is divided into two framed when performing enlarge and display for viewing the contents in detail.

With respect to the above-mentioned points, a change can be made without departing from the scope of the present invention, and can be determined appropriately in accordance with application forms thereof.

Second Embodiment

A second embodiment of the present invention is operable to display a thumbnail image on a first display screen of a document display apparatus. A difference between the first embodiment and the second embodiment is that the second embodiment permits selection of contents to view on an individual document element basis from among thumbnail images of the document data (for example, document image data, application data, etc.).

Thus, a description will be given by focusing on a display process of the thumbnail image and a document element selection process on the thumbnail image. Structures and processes in the second embodiment are the same as the first embodiment as to the example of use environment of the document display apparatus shown in FIG. 1, the hardware structure of the document display apparatus shown in FIG. 2, the example of the structure of the document elements shown in FIG. 3, the entire process of the document display apparatus shown in FIG. 4, the example of use environment of the document display apparatus shown in FIG. 5, the display process of the selected document element shown in FIG. 14, and the preprocess in the display process of document element shown in FIG. 15. Thus, FIGS. 1 through 5, 14 and 15 will be used in the description of the second embodiment but descriptions thereof will be omitted.

Additionally, the structure shown in FIG. 6 and the process until the selected document element is displayed shown in FIG. 13 are common to the second embodiment, and parts and processes the same as the parts and processes shown in FIG. 6 and FIG. 13 are given the same reference numerals and descriptions thereof will be omitted.

A description of a difference between the second embodiment and the first embodiment will be given with reference to a structure of a main part shown in FIG. 19, display examples of before and after selection of the document element 41 shown in FIG. 20, an example of enlarged display when the document element 41 is selected shown in FIG. 21, an example of giving correspondence between a divided area of a thumbnail image and the document element 41 shown in FIG. 22, a process to detect selection of document element 41 from the thumbnail image shown in FIG. 23, an example of display when a cursor is moved to another document element 41 shown in FIG. 24, and a process to detect selection of the document element 41 by a movement of the cursor, in that order.

First, a description will be given, with reference to FIG. 19, of how the document display apparatus 10 achieves a process of selecting the contents to view on an individual document element 41 basis from the thumbnail image of the document data 40 (for example, document image data, application data, etc.), which is a difference between the present embodiment and the first embodiment. FIG. 19 is a block diagram of a structure of a main part of the document display apparatus according to the second embodiment of the present invention.

Figure 19:
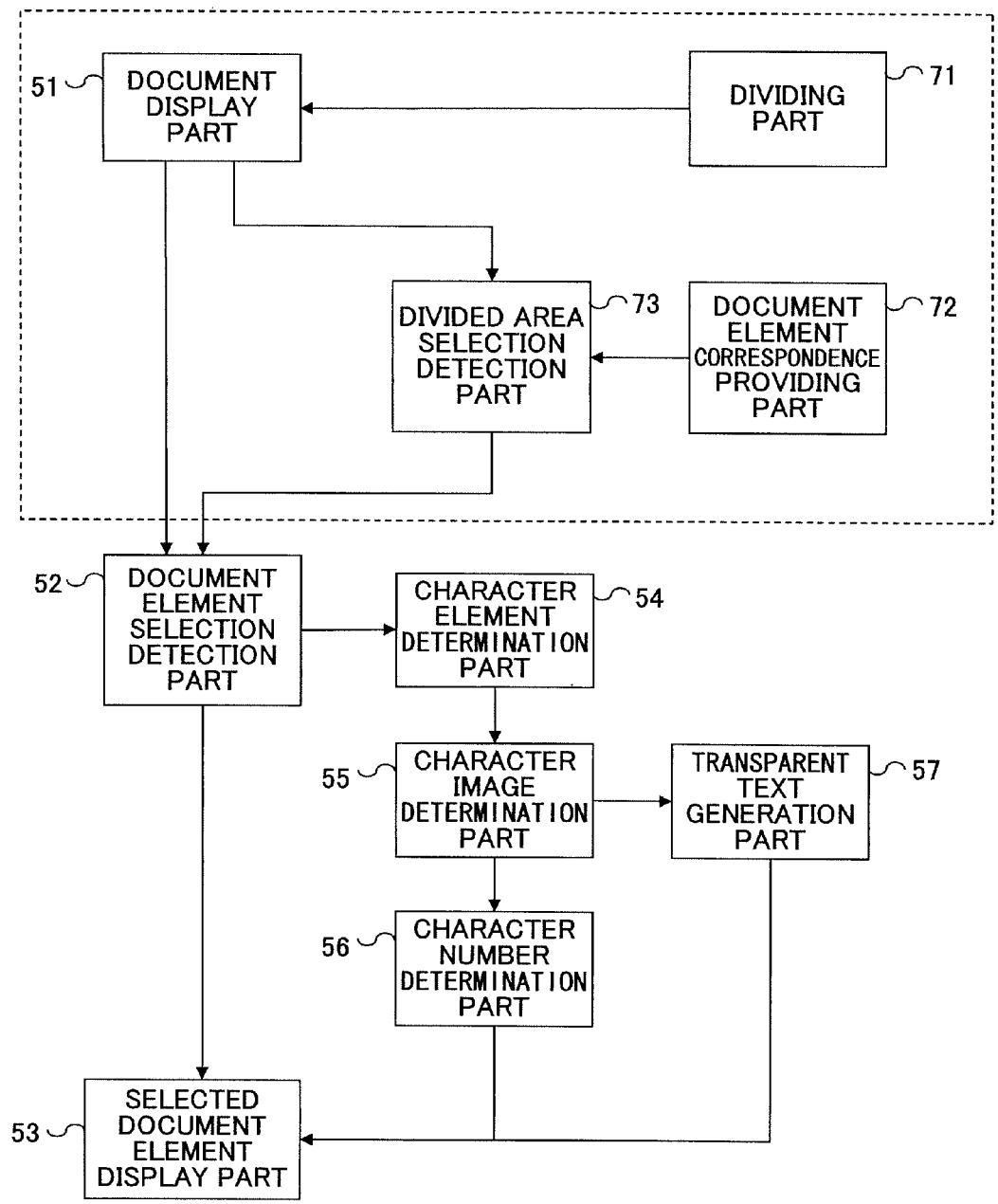
FIG. 19 is a block diagram of a part of the document display apparatus according to the second embodiment.

The main part shown in FIG. 19 includes a document display unit 51, a document element selection detection unit 52, a selected document element display unit 53, a character element determination unit 54, a character image determination unit 55, a character number determination unit 56, a transparent text generation units 57, an area dividing unit 71, a document element correspondence providing unit 72, and a divided area selection detection unit 73.

The document display unit 51, the document element selection detection unit 52, the selected document element display unit 53, the character element determination unit 54, the character image determination unit 55, the character number determination unit 56, and the transparent text generation unit 57 are the same as the first embodiment as explained with reference to FIG. 6, and descriptions thereof will be omitted. Thus, a description will be given below, with reference to FIG. 20, FIG. 21 and FIG. 22, of the area dividing unit 71, the document element correspondence providing unit 72, the divided area selection detection unit 73 and the document display unit 51.

First, the area dividing unit 71 and the document element corresponding providing unit 72 will be explained.

The area dividing unit 71 divides a thumbnail image into a plurality of areas (divided areas). The document element correspondence providing unit 72 causes the document elements 41 to correspond to the divided areas of the thumbnail image which is divided by the area dividing unit 71.

Figure 20:
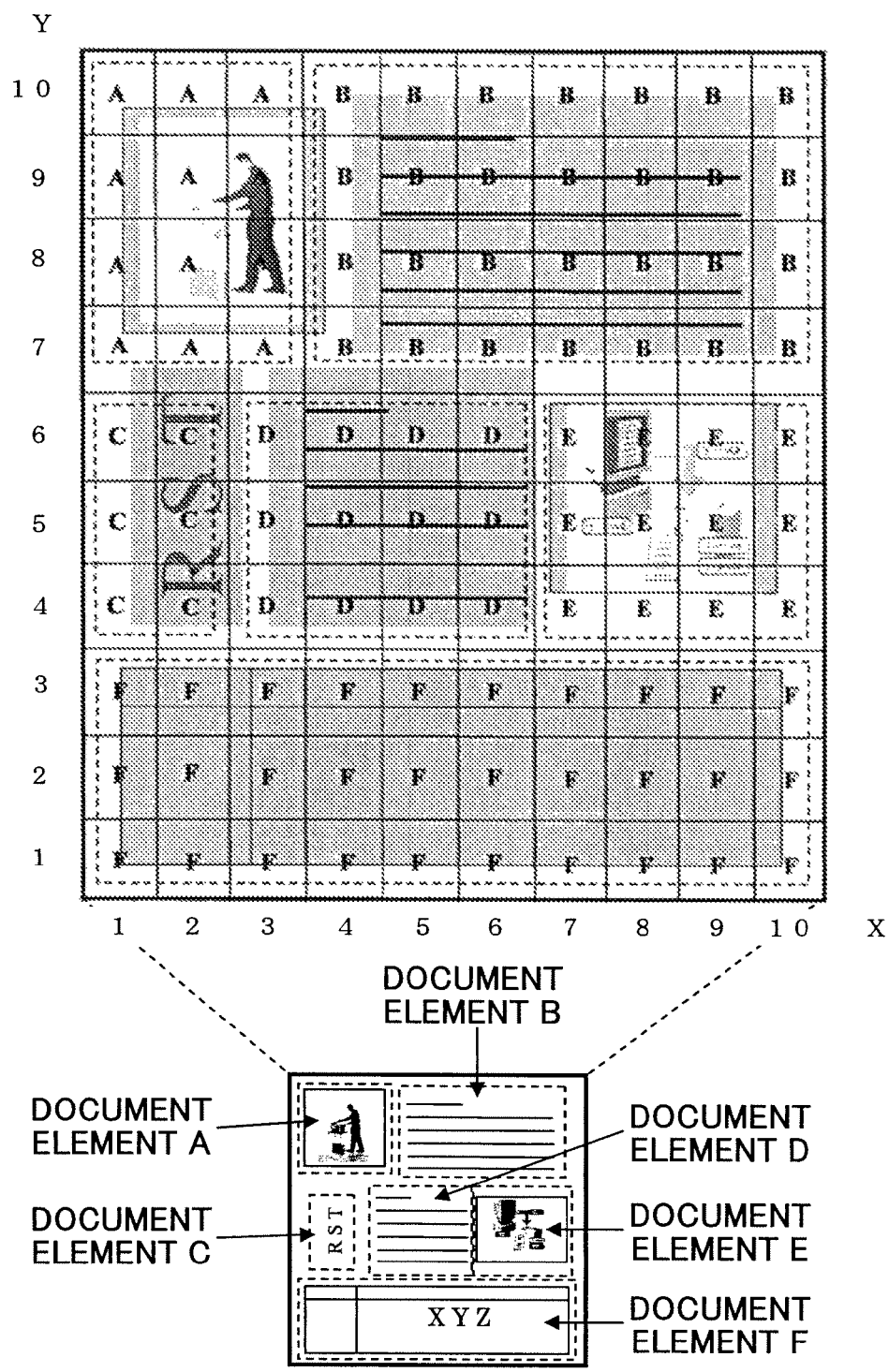
FIG. 20 is an illustration showing a correspondence between a divided area of a thumbnail image and document elements according to the second embodiment of the present invention.

FIG. 20 shows an example of correspondence between the divided areas of the thumbnail image and the document elements 41 according to the second embodiment of the present invention. A description will be given below, with reference to FIG. 20, of a method of providing correspondence between the divides areas of the thumbnail image and the document elements 41 performed by the area dividing unit 71 and the document element correspondence providing unit 72.

First, the area dividing unit 71 divides the thumbnail image into the areas of 10×10, as shown in FIG. 20. The divided areas acquired by the area dividing unit 71 are allocated in a two-dimensional coordinates (x, y) of the thumbnail image, and a range and a position of each divided area can be determined according to the two-dimensional coordinates (hereinafter, referred to as a coordinate space of the thumbnail image). Next, the document element correspondence providing unit 72 determines a range and a position of each document element 41 from the two-dimensional coordinate values (x, y) of the document image (hereinafter, referred to as a coordinate space of the document image), and cause the coordinate space of the thumbnail image to correspond to the coordinate space of the document image. Consequently, the document element correspondence providing unit 72 can cause the document elements 41 to correspond the divided areas of the thumbnail image.

Moreover, when the correspondence is provided between the coordinate space of the thumbnail image and the coordinate space of the document image, the document element correspondence providing unit 72 determines, if a plurality of document elements correspond to one document element 41, which divided area of the thumbnail image is to be corresponded to the document element 41 in accordance with an area ratio of areas occupied by the document elements 41.

For example, from among the document elements 41 constituting the document data 40 (for example document image data, application data, etc.), the document element A is caused to correspond to a range from the divided area (1, 7) to the divided area (3, 10) of the thumbnail image, the document element B is caused to correspond to a range from the divided area (4, 7) to the divided area (10, 10) of the thumbnail image, the document element C is caused to correspond to a range from the divided area (1, 4) to the divided area (2, 6) of the thumbnail image, the document element D is caused to correspond to a range from the divided area (3, 4) to the divided area (6, 6) of the thumbnail image, the document element E is caused to correspond to a range from the divided area (7, 4) to the divided area (10, 6) of the thumbnail image, and the document element F is caused to correspond to a range from the divided area (1, 1) to the divided area (10, 3) of the thumbnail image.

The document element correspondence providing unit 72 uses discrimination ID (for example, a serial number in an order of structures in the entire document, a serial number in an order of structures in a hierarchy of chapters, clauses and items, etc.) as information of the document elements 41 to be caused to correspond to the divided areas of the thumbnail image. Moreover, the document element correspondence providing unit 72 retains, as table data, information (divided area information and document element discrimination ID: hereinafter, referred to as document element correspondence information) of the document elements 41 caused to correspond to the divided areas of the thumbnail image such as shown in FIG. 20.

Returning to FIG. 19, the divided area selection detection unit 73 will be explained. The divided area selection detection unit 73 detects that one of the divided areas of the thumbnail image divided by the area dividing unit 71 is selected by the input device such as a mouse or the like, and notifies the document element selection detection unit 52 of the fact that the document element 41 corresponding to the detected divided area is selected. The divided area selection detection unit 73 detects that the divided area of the thumbnail image is selected by receiving an input signal from the input device such as clicking by a mouse, and refers to the document element correspondence information (divided area information and document element discrimination ID) which the document element correspondence providing unit 72 retains as data, and specifies the document element 41 corresponding to the detected divided area. Moreover, the divided area selection detection unit 73 notifies the document element selection detection unit 52 of the fact that the document element 41 is selected from the specified document element 41.

A description will now be given of the document display unit 51 to which an additional function is added. The document display unit 51 displays the thumbnail image, of which area is divided by the area dividing unit 71, in the first display area 61. Additionally, the document display unit 51 displays the thumbnail image by superimposing color or frame lines on the divided areas detected by the divided area selection detection unit 73 in the first display area 61 (the divided area caused to correspond to the selected document element 41 and other divided areas are displayed in different forms).

Hereinafter a description will be given, with reference to FIG. 21, of an example of an enlarged display of the document element 41 in the second display area 62. In the example, the thumbnail image is divided into a plurality of areas by the area dividing unit 71, the document elements 41 are caused to correspond to the divided areas of the thumbnail image by the document element correspondence providing unit 72, the selection of the divided area of the thumbnail image is detected by the divided area selection detection unit 73 by the input device such as a mouse, and the document element selection and detection unit 52 is notified of the fact that the document element 41 which is caused to correspond to the detected divided area is selected.

Figure 21A:
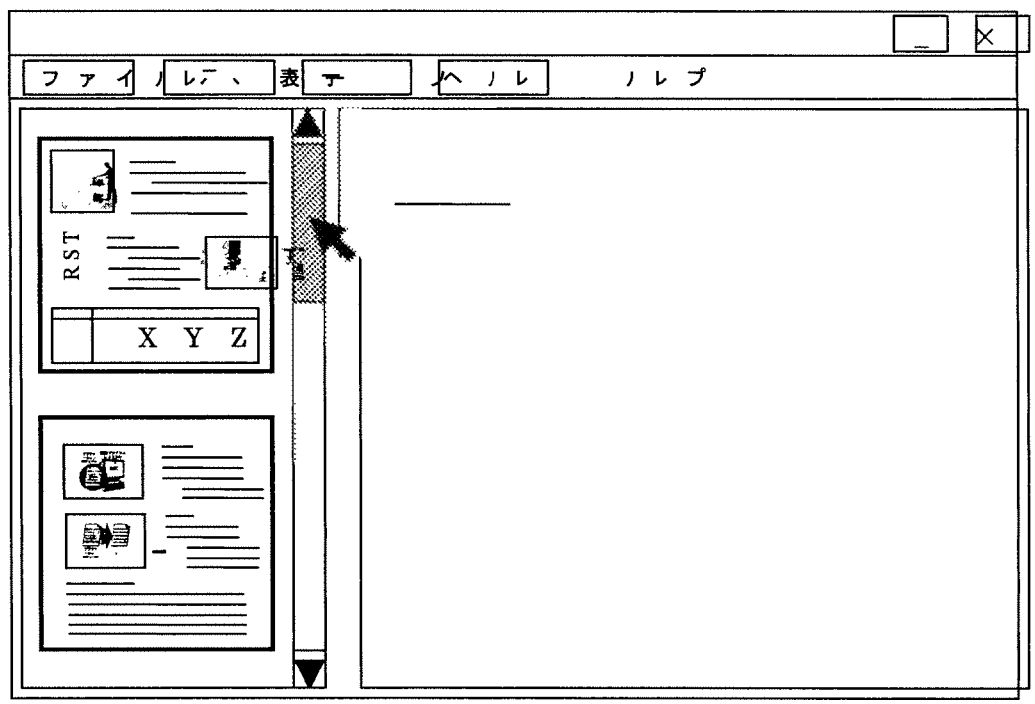
FIG. 21A is an illustration of a display screen before selecting document elements according to the second embodiment of the present invention.
Figure 21B:
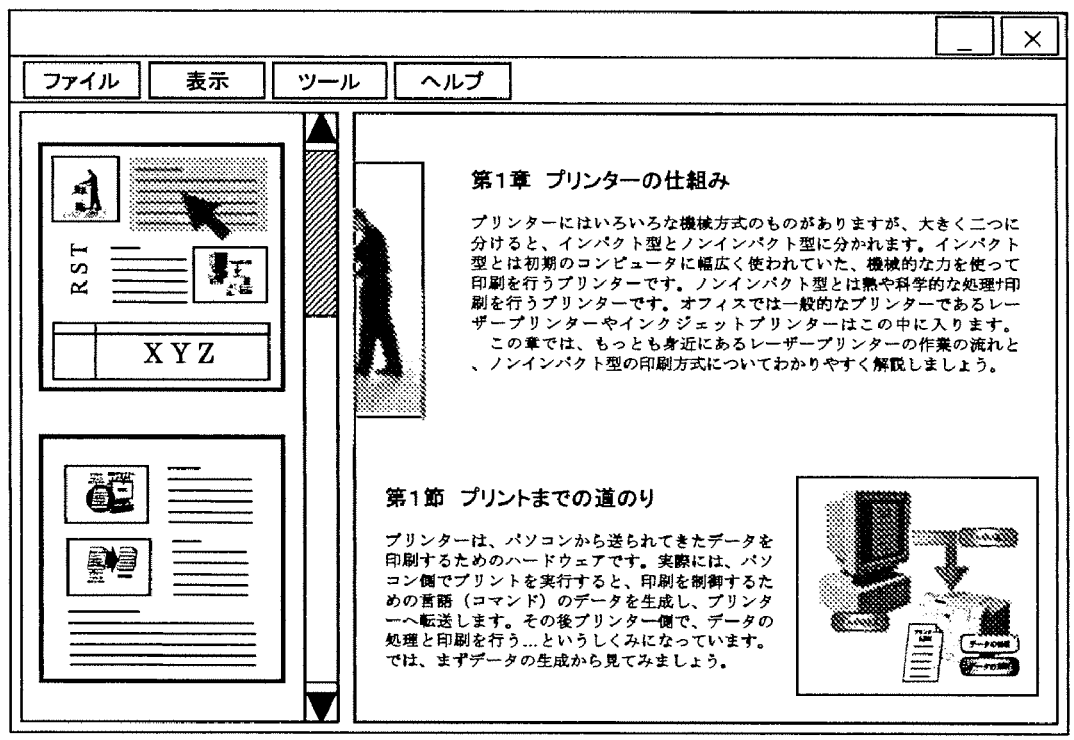
FIG. 21B is an illustration of a display screen after selecting document elements according to the second embodiment of the present invention.
Figure 22:
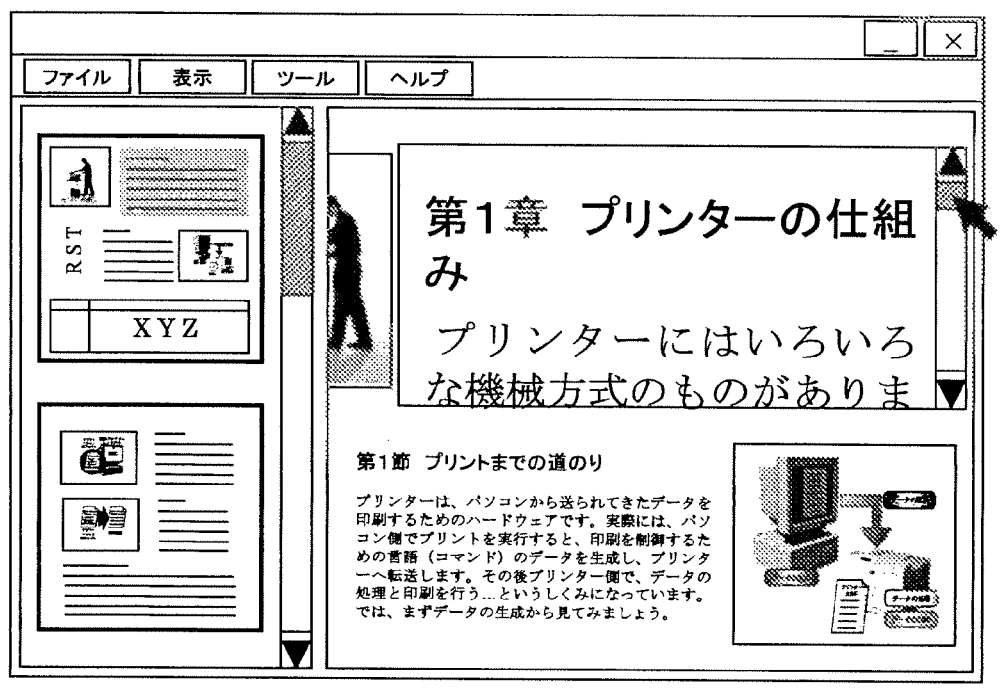
FIG. 22 is an illustration of a display screen displaying an enlarged document element when the document element is selected according to the second embodiment of the present invention.

FIG. 21A shows an example of display of the document element 41 before selection of the document element 41. FIG. 21B shows an example of display of the document element 41 after selection of the document element 41.

First, as shown in FIG. 21A, in order to select the document element 41 to view, the scroll bar 64 is moved, if necessary, by the input device such as a mouse. Then, as shown in FIG. 21B, the document element 41 to view is selected by the input device such as a mouse from the thumbnail image of the document data 40 (for example, document image data, the application data, etc.) displayed in the first display area 61. Consequently, the divided area selection detection unit 73 notifies the document element selection detection unit 52 of the fact that the document element is selected. Then, the document element selection detection unit 52 detects the selection of the document 41 in accordance with the notified information. The selected document element display unit 53 enlarges and displays the selected document element 41 in the second display area 52.

Moreover, The document display unit 51 displays the document element 41 by superimposing a color image onto the divided area detected by the divided area selection detection unit 72 (the divided area to which the selected document element is corresponded and other divided areas are displayed in different forms). Thus, the document display apparatus 10 displays the thumbnail image divided by the area dividing unit 71 into a plurality of areas in the first display area 61 of the display screen of the display unit 14 according to the display form (screen layout) by using the document display unit 51.

Next, the divided area selection detection unit 73 of the document display apparatus 10 detects that the divided area of the thumbnail image displayed in the first display area 61 is selected, and notifies the document element selection detection unit 52 of the fact that the document element 41 which the document element correspondence providing unit causes to correspond to the divided area of the thumbnail image is selected. Thereafter, the document element selection detection unit 52 of the document display apparatus 10 detects that the document element 41 is selected in accordance with the notified information, and the selected document element display unit 53 enlarges and displays the selected document element 41 in the second display area 62.

Moreover, the document display apparatus 10 displays the document element 41 by superimposing a color image onto the divided area detected by the divide area selection detection unit 72 in the thumbnail image displayed in the first display area 61 (the divided area to which the selected document element 41 is caused to correspond and other divided areas are displayed in different forms). Also in the present embodiment, the document element selection detection unit 52, the selected document element display unit 53, the character element determination unit 54, the character image determination unit 55, the character number determining unit 56, and the transparent text generation unit 57 are the same as the units that have been explained with reference to FIG. 6. Thus, the document element folding process, the transparent text generating process, and the document element relevant information display process can be performed so that the document element 41 is further enlarged and displayed at the same display position in the second display area 62 by selecting the document element 41 selected first time is selected again by the input device.

A description will now be given in more detail, with reference to FIGS. 23, 24A, 24B and 25, of the process of the document display apparatus 10, which was explained with reference to FIGS. 19 through 22. FIG. 23 is a flowchart showing the process to detect the selection of the document element from the thumbnail image and notify of the fact that the document element 41 is selected.

Before illustrating FIG. 23, a program structure for achieving the function of the present embodiment will be explained. The program structure to achieve the function of the present embodiment is roughly divided into two programs. One is a program for performing a process of displaying the thumbnail image in the first display area 61 and notifying the document element selection detection unit 52 of the fact that the document element 41 caused to correspond to the divided area detected by the divided area selection detection unit 73 is selected. The other is a program for performing a process to display the selected document element 41 in the second display area 62 by the selected document element display unit 53 in accordance with the information notified by the divided area element display unit 53. The process of displaying the selected document element 41 in the second display area 62 corresponds to the process of S202 to detect whether or not the document element 41 is selected and the selected document element display process of step S203.

Figure 23:
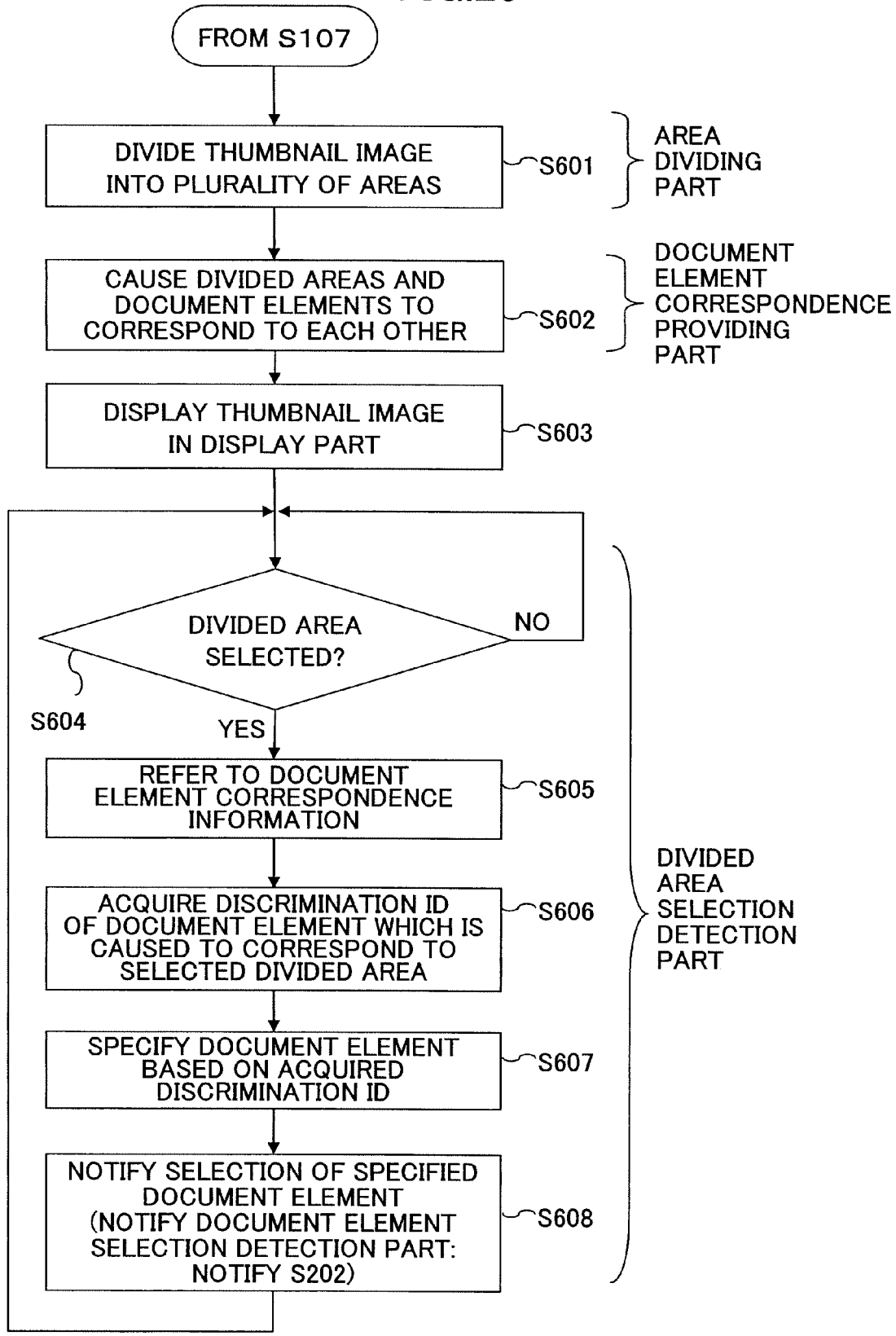
FIG. 23 is a flowchart of a process to notify a user of selection of a document element upon detection of the selection of the document element from thumbnail image according to the second embodiment of the present invention.

Referring to FIG. 23, the process of displaying the thumbnail image in the first display area 61 and notifying the document element selection detection unit 52 of the fact that the document element 41 caused to correspond to the divided area detected by the divided area selection detection unit 73 is selected will be explained. The document display apparatus 10 divides the thumbnail image displayed in the first display area 61 by the area dividing unit 71 (step S601). Then, document element correspondence providing unit 72 of the document display apparatus 10 causes the divided areas of the thumbnail image and the discrimination ID of the document elements 41 to correspond to each other in accordance with the correspondence between the coordinate space of the thumbnail image and the coordinate space of the document image, and retains the correspondence information as the document element correspondence information (step S602).

Then, the divided area selection detection unit 73 of the document display apparatus 10 determines whether or not the area divided by the area dividing unit 71 is selected in the thumbnail image displayed in the first display area 61 (step S604). If it is not detected that the divide area of the thumbnail image is selected (NO of step S604), the document display apparatus 10 continuously waits for the detection of the selection of the divided area of the thumbnail image by the divided area selection detection unit 73. On the other hand, if it is detected that the divide area of the thumbnail image is selected (YES of step S604), the document display apparatus 10 refers to the document element correspondence information (divided area information and document element discrimination ID) retained in the divided area selection detection unit 73 (step S605).

Then, the document display apparatus 10 acquires the discrimination ID of the document element 41 corresponding to the divided area of the detected thumbnail image from the document element correspondence information (divided area information and document element discrimination ID) by the divided area selection detection unit 73 (step S606). Thereafter, the document display apparatus 10 specifies the document element 41 based on the acquired discrimination ID by the divided area selection detection unit (step S607). Finally, the document display apparatus 10 notifies the document element selection detection unit 52 of the fact that the document element 41 specified by the divided area selection detection unit 73 is the selected document element 41 (step S608).

Figure 24A:
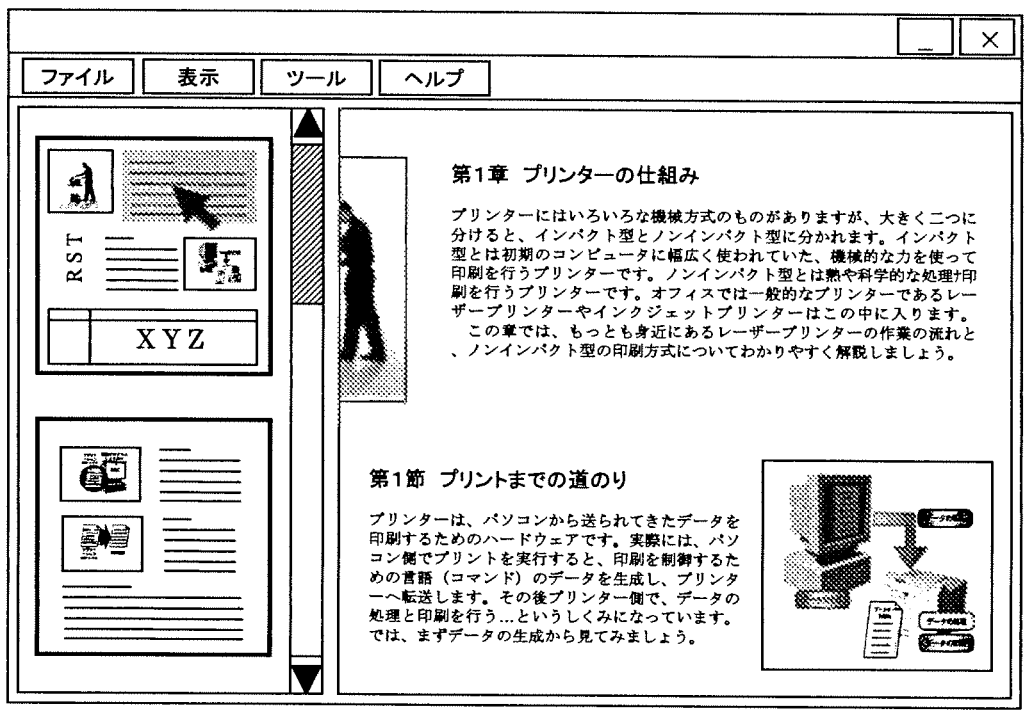
FIG. 24A is an illustration of a screen display when a cursor is not moved from the presently selected document element according to the second embodiment of the present invention.
Figure 24B:
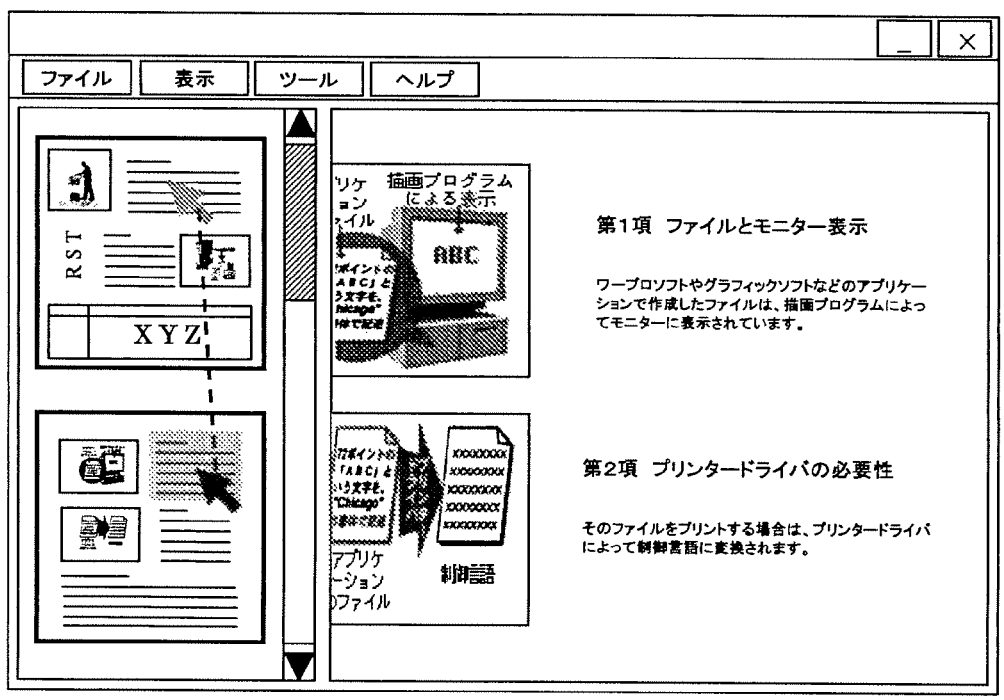
FIG. 24B is an illustration of a screen display when a cursor is moved to a document element other than the presently selected document element according to the second embodiment of the present invention.

FIG. 24 shows an example of display when the cursor 65 is move to another document element 41 according to the second invention of the present invention. In the example of the display shown in FIG. 24, the document element 41 to which the cursor 65 is moved is enlarged and displayed in the second display area 62 of the display screen of the display unit 14 by moving the cursor 65 of the mouse to another document element 41 other than the presently selected document element 41. The document display apparatus 10 displays the presently selected document element 41 in the second display area while the cursor 65 is not moved from the presently selected document element 41 as shown in FIG. 24A. However, if the cursor 65 of a mouse moves to the document element 41 other than the presently selected document element 41 (a dotted line in FIG. 24B indicates a trace of movement of the cursor 65), the document display apparatus 10 of the present invention, as shown in FIG. 24B, regarded that the document element 41 pointed by the cursor 65 is selected at the time the cursor 65 of the mouse stops, and displays the document element 41 to which the cursor 65 is moved in the second display area 62.

A description will be given in detail below, with reference to FIG. 25, of the process of the document display apparatus 10 explained with reference to FIGS. 24A and 24B. FIG. 25 is a flowchart showing the process of detecting the selection of the document element 41 by the movement of the cursor and notifying the fact that the document element 41 is detected. With reference to FIG. 25, similar to FIG. 23, a description will be given of the process of displaying the thumbnail image in first display area 61 and notifying the document element selection detection unit 52 of the fact that the document element corresponding to the divided area detected by the divided area selection detection unit 73 is selected.

The document display apparatus 10 divides the thumbnail image to be displayed in the first display area 61 by the area dividing unit 71 (step S701). Then, the document element correspondence providing unit 72 causes the divided areas of the thumbnail image to correspond to the discrimination IDs of the document elements (for example, a serial number of structures in the entire document, a serial number of structures in a hierarchy of chapters, clauses and items, etc.), and retains the correspondence information as the document element correspondence information (divided area information and document element discrimination ID) (step S702).

Then, the document display apparatus 10 displays the thumbnail image in the first display area 61 of the display screen of the display unit 14 by the document display unit 51 (step S703). Thereafter, the document display apparatus 10 determines whether or not the cursor 65 of the mouse is stopped in the display screen of the display unit 14 (step S704). If the cursor 65 of the mouse is moving (NO of S704), the document display apparatus 10 continuously wait for until the cursor 65 stops. On the other hand, if the cursor 65 of the mouse is stopped (YES of step S704), the divided area selection detection unit 73 of the document display apparatus 10 acquires position information (x, y) of the cursor 65 from the coordinate space on the display screen (step S705).

Then, the document display apparatus 10 specifies a position of the divided area at which the cursor 65 of the mouse is stopped in accordance with the position information (x, y) of the cursor 65 acquired by the detected area selection detection unit 73 and the coordinate space of the thumbnail image displayed in the first display area 61.

Then, the document display apparatus 10 refers to the document element correspondence information (divided area information and document element discrimination ID) retained in the divided area selection detection unit 73 (step S707). The document display apparatus 10 acquires the discrimination ID of the document element 41 corresponding to the divided area of the specified thumbnail image from the document element correspondence information (divided area information and document element discrimination ID) by the divided area selection detection unit 73 (step S708). Thereafter, the document display apparatus 10 specifies the document element 41 based on the acquired discrimination ID by the divided area selection detection unit 73 (step S709).

Then the document display apparatus determined whether or not the specified document element 41 is the document element 41 other than the presently selected document element 41 (step S710). If the specified document element 41 is the document element 41 other than the presently selected document element 41 (YES of step S710), the divided area selection detection unit 73 notifies the document element selection detection unit 52 of the fact that the document element 41 specified by the divided area selection detection unit 73 is the selected document element 41 (step S711). On the other hand, if the specified document element 41 is not the document element 41 other than the presently selected document element 41 (NO of step S710), the process returns to the process of step S704 where it is determined whether or not the cursor 65 of the mouse is stepped on the display screen of the display unit 14, and waits until the cursor 65 moves to and stops at the document element 41 other than the presently selected document element 41.

As mentioned above, according to the second embodiment of the present invention, the document display apparatus 10 can display by the document display unit 51 the thumbnail image which is divided into a plurality of areas by the area dividing unit 71 in the first display area 61.

Thereafter the document display apparatus 10 detects the divided area selection detection unit 73 that the divided area of the thumbnail image displayed in the first display area 61 is selected, and notifies the document element selection detection unit 52 of the fact that the document element 41 which the document element correspondence providing unit 72 caused to correspond to the divided area of the thumbnail image is selected. Thus, the document element selection detection unit 52 detects the selection of the document element 41 in accordance with the notified information, and the selected document element 41 can be enlarged and displayed in the second display area 62.

Therefore, the document display apparatus 10 can select the contents which a user wants to view based on the document information of each page of a document, thereby achieving good operationality with which a user can easily view the contents of the document.

Moreover, if the selected document element 41 is enlarged and displayed in the second display area 62 of the display screen of the display unit 14, the document display apparatus 10 can display the thumbnail image with an image such as a color image and frame lines being superimposed onto the divided area detected by the divided area selection detection unit 72 in the thumb nail image displayed in the first display area 61 of the display screen of the display unit 14 (in the divided areas of the thumbnail image, the divided area to which the document element determined to be selected is caused to correspond and other divided areas can be displayed in different forms).

Therefore, the document display apparatus 10 can clearly distinguish the selected document element 41 from other document element 41, thereby achieving good visibility which facilitates viewing of the document. Thus, the document display apparatus 10 can realize the operationality and visibility which permits a user to view the contents of the document data 40 (for example, document image data, application data, etc.).

Although the present invention has been explained with reference to the second embodiment, the present invention is not limited to the number of divided areas 10×10 of the thumbnail image and other arbitrary numbers may be used.

Moreover, the above-mentioned program structure is an example of the structure in which the document display function is divided into two programs, and the present invention is not limited to that.

Moreover, the cursor 65 of the mouse which selects the divided area of the thumbnail image is an example of a character movable in response to a movement of a pointing device which selects the divided area of the thumbnail image displayed on the display screen of the display par 14, and the present invention is not limited to the use of a cursor of a muse.

Moreover, the example (for example, shown in FIG. 21) of the display by the document display unit 51 explained in the above-mentioned embodiment is an example of display, and the present invention is not limited to such an example. For example, a display area (first display area) which displays a list of the thumbnail image may be displayed on the display screen, and, if there are contents which a user wants to view, the thumbnail image corresponding to a page containing the contents may be selected and the selected document element 41 may be enlarged and displayed in a window (second display area) different from the first display area where the list of the thumbnail image is displayed.

The present invention is not limited to the specifically disclosed embodiments, and variations and modifications may be made without departing from the scope of the present invention.

What is claimed is:

1. A document display apparatus to extract a document element constituting a document and enlarges and displays the extracted document element, the document display apparatus comprising:
    a memory;
    a document display unit to display the document element in a first display area;
    a document element selection detection unit to detect selection of the document element displayed by the document display unit;
    a selected document display unit to display the document element detected by the document element selection detection unit in a second display area different from the first display area;
    a character element determination unit to determine whether the document element detected by the document element selection detection unit is a character element;
    a character image determination unit to determine whether the document element determined to be a character element by the document element selection detection unit is a character image; and
    a character number determination unit to determine whether a number of characters per one line in the second display area before enlarge display is greater than a number of characters per one line in the second display area after the enlarge display with respect to the character image determined to be a character image by the character image determination unit,
    wherein the selected document element display unit displays the character image in the second display area by folding the character image when enlarging and displaying the character image if the character number determination unit determines that the number of characters per one line in the second display area before enlarge display is greater than the number of characters per one line in the second display area after the enlarge display.

2. The document display apparatus as claimed in claim 1, further comprising:
    a character element determination unit to determine whether the document element detected by the document element selection detection unit is a character element;
    a character image determination unit to determine whether the document element determined to be the character element is a character image; and
    a transparent text generation unit to generate a transparent text with respect to the character image based on a result of character recognition,
    wherein the selected document element display unit displays the character image and the transparent text by superposing onto each other by the transparent text generation unit when the character image determination unit determines that the character element is a character image.

3. The document display apparatus as claimed in claim 1, further comprising:
    a character element determination unit to determine whether the document element detected by the document element selection detection unit is a character element, wherein the selected document element determination unit compresses the document element other than the character element in order to fit in the display area when the document element determined to be an element other than a character element by the character element determination unit does not fit in a width and/or a height of the second display area.

4. The document display apparatus as claimed in claim 1, wherein, when displaying the document element detected by the document element selection detection unit, the selected document element display unit displays document information positioned in a periphery of the document element in the first display area at a corresponding position in the second display area together with the document element.

5. The document display apparatus as claimed in claim 1, wherein the document display unit displays a thumbnail image of an entire document in the first display area.

6. The document display apparatus as claimed in claim 5, further comprising:
   a thumbnail image area dividing unit to divide the thumbnail image into a plurality of divided areas;
   a document element correspondence providing unit to cause the document elements to correspond to the divided areas acquired by the thumbnail image area dividing unit; and
   a divided area selection detection unit to detect selection of the divided areas acquired by the thumbnail image area dividing unit,
   wherein the divided area selection detection unit notifies the document element selection detection unit of a fact that a document element caused to correspond by the document element correspondence providing unit is selected.

7. The document display apparatus as claimed in claim 6, wherein, when the divided area selection detection unit detects that one of the divided areas is selected, the document display unit displays one of the divided areas to which the document element the same as the detected divided area is corresponded, in a form different from a form of a divided area caused to correspond to a document element different from the document element of the detected divided area.

8. An article of manufacture, comprising a non-transistory computer-readable medium having a computer readable document display program which, when executed by a computer, cause the computer to perform operations comprising:
   extracting a document element constituting a document;
   displaying the document element in a first display area;
   detecting selection of the displayed document element;
   displaying the detected document element in a second display area different from the first display area;
   determining whether the detected document element is a character element;
   determining whether the document element determined to be a character element is a character image; and
   determining whether a number of characters per one line in the second display area before enlarge display is greater than a number of characters per one line in the second display area after the enlarge display with respect to the character image determined to be a character image,
   wherein the character image in the second display area is displayed by folding the character image when enlarging and displaying the character image if the number of characters per one line in the second display area before enlarge display is greater than the number of characters per one line in the second display area after the enlarge display.

* * * * *